(12) United States Patent
Kudo

(10) Patent No.: US 7,510,588 B2
(45) Date of Patent: Mar. 31, 2009

(54) CERAMIC FILTER AND EXHAUST GAS DECONTAMINATION UNIT

(75) Inventor: Atsushi Kudo, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 298 days.

(21) Appl. No.: 10/506,247

(22) PCT Filed: Mar. 31, 2003

(86) PCT No.: PCT/JP03/04104

§ 371 (c)(1),
(2), (4) Date: Sep. 9, 2004

(87) PCT Pub. No.: WO03/086579

PCT Pub. Date: Oct. 23, 2003

(65) Prior Publication Data

US 2005/0102987 A1    May 19, 2005

(30) Foreign Application Priority Data

Mar. 29, 2002   (JP)   ............................. 2002-096554
Mar. 29, 2002   (JP)   ............................. 2002-096906

(51) Int. Cl.
*B01D 39/20*   (2006.01)
*F01N 3/02*   (2006.01)

(52) U.S. Cl. ........................ 55/523; 422/180
(58) Field of Classification Search .................. 55/523, 55/DIG. 30; 428/116, 117, 118; 60/297, 60/311; 422/180; 502/527.19
See application file for complete search history.

(56) References Cited

U.S. PATENT DOCUMENTS

| 4,305,910 | A |   | 12/1981 | Kudo et al. | |
| 4,455,336 | A | * | 6/1984 | Ogawa et al. | 428/116 |
| 4,810,554 | A | * | 3/1989 | Hattori et al. | 428/116 |
| 5,043,311 | A |   | 8/1991 | Engler et al. | |
| 5,171,335 | A | * | 12/1992 | Kojima et al. | 55/523 |
| 5,456,965 | A | * | 10/1995 | Machida et al. | 428/116 |
| 5,914,187 | A |   | 6/1999 | Naruse et al. | |
| 5,930,994 | A |   | 8/1999 | Shimato et al. | |
| 6,220,022 | B1 |   | 4/2001 | Müller et al. | |
| 6,447,564 | B1 |   | 9/2002 | Ohno et al. | |
| 6,565,630 | B2 |   | 5/2003 | Ohno et al. | |

(Continued)

FOREIGN PATENT DOCUMENTS

DE    24 28 964    1/1976

(Continued)

OTHER PUBLICATIONS

U.S. Appl. No. 10/506,247, filed Sep. 9, 2004, Kudo.

(Continued)

*Primary Examiner*—Frank M Lawrence
(74) *Attorney, Agent, or Firm*—Oblon, Spivak, McClelland, Maier & Neustadt, P.C.

(57) ABSTRACT

A ceramic filter including a ceramic block having a honeycomb structure. The ceramic block has one or more filter units which is a porous ceramic sintered body. The filter units are joined to each other by a sealing material layer. The ceramic block has different porosities, different pore size, different strengths, different lengths, different catalysts or different amounts of catalysts at different portions of the ceramic block.

75 Claims, 12 Drawing Sheets

U.S. PATENT DOCUMENTS

| | | | |
|---|---|---|---|
| 6,656,564 B2 * | 12/2003 | Ichikawa et al. | 428/116 |
| 6,669,751 B1 | 12/2003 | Ohno et al. | |
| 6,764,743 B2 * | 7/2004 | Kato et al. | 428/118 |
| 6,770,116 B2 | 8/2004 | Kojima | |
| 6,902,599 B2 * | 6/2005 | Bardon | 55/523 |
| 7,119,046 B2 | 10/2006 | Ohno et al. | |
| 7,196,037 B2 | 3/2007 | Ohno et al. | |
| 2001/0003728 A1 * | 6/2001 | Ito et al. | 502/439 |
| 2004/0031264 A1 | 2/2004 | Kojima | |
| 2004/0033175 A1 | 2/2004 | Ohno et al. | |
| 2004/0055265 A1 | 3/2004 | Ohno et al. | |
| 2004/0076794 A1 * | 4/2004 | Hijikata | 428/116 |
| 2004/0131512 A1 * | 7/2004 | Abe et al. | 422/180 |
| 2004/0161596 A1 | 8/2004 | Taoka et al. | |
| 2005/0169818 A1 | 8/2005 | Ohno et al. | |
| 2006/0188415 A1 | 8/2006 | Ohno et al. | |
| 2006/0194018 A1 | 8/2006 | Ohno et al. | |
| 2008/0017572 A1 | 1/2008 | Kudo | |

FOREIGN PATENT DOCUMENTS

| | | |
|---|---|---|
| DE | 198 12 321 | 9/1999 |
| EP | 0 241 269 | 10/1987 |
| EP | 0 820 810 A1 | 1/1998 |
| EP | 1 142 619 A1 | 10/2001 |
| EP | 1 174 399 A1 | 1/2002 |
| EP | 1 415 779 A1 | 5/2004 |
| EP | 1 484 483 A1 | 12/2004 |
| EP | 1 486 243 A1 | 12/2004 |
| GB | 2 342 055 A | 4/2000 |
| JP | 61-152716 | 9/1986 |
| JP | 1-145377 | 6/1989 |
| JP | 03-000915 | 1/1991 |
| JP | 06-287650 | 10/1994 |
| JP | 8-28246 | 1/1996 |
| JP | 09-168723 | 6/1997 |
| JP | 10-043604 | 2/1998 |
| JP | 2000-279728 | 10/2000 |
| JP | 2001-190916 | 7/2001 |
| JP | 2001-206780 | 7/2001 |
| JP | 2002-301325 | 10/2002 |
| JP | 2003-010616 | 1/2003 |
| JP | 2003-25316 | 1/2003 |
| JP | 2003-117320 | 4/2003 |
| JP | 2003-254034 | 9/2003 |
| WO | 03/067041 | 8/2003 |
| WO | 03/067042 | 8/2003 |
| WO | 03/071105 | 8/2003 |
| WO | 03/074848 | 9/2003 |
| WO | 03/078026 | 9/2003 |
| WO | 03/080219 | 10/2003 |
| WO | 03/081001 | 10/2003 |
| WO | 04/076027 | 9/2004 |

OTHER PUBLICATIONS

U.S. Appl. No. 10/530,561, filed Apr. 7, 2005, Komori et al.
U.S. Appl. No. 10/515,179, filed Nov. 26, 2004, Yamada.
U.S. Appl. No. 10/515,181, filed Nov. 26, 2004, Komori et al.
U.S. Appl. No. 10/514,560, filed Nov. 30, 2004, Ohno et al.
U.S. Appl. No. 10/516,328, filed Dec. 14, 2004, Komori et al.
U.S. Appl. No. 10/518,373, filed Dec. 28, 2004, Ohno et al.
U.S. Appl. No. 09/926,795, Unknown.
U.S. Appl. No. 10/671,418, filed Sep. 26, 2003, Ohno et al.
U.S. Appl. No. 10/129,126, Unknown.
U.S. Appl. No. 10/362,975, filed Oct. 1, 2001, Ohno et al.
U.S. Appl. No. 10/296,027, filed Mar. 20, 2002, Kojima.
U.S. Appl. No. 10/477,741, filed May 31, 2002, Taoka et al.
U.S. Appl. No. 10/490,206, filed Sep. 2, 2004, Hong et al.
U.S. Appl. No. 10/490,205, filed Sep. 9, 2004, Komori et al.
U.S. Appl. No. 10/493,056, filed Aug. 17, 2004, Hong et al.
U.S. Appl. No. 10/502,045, filed Jul. 29, 2004, Kudo et al.
U.S. Appl. No. 10/502,054, filed Jul. 30, 2004, Kudo et al.
U.S. Appl. No. 10/510,344, filed Oct. 6, 2004, Ohno.
U.S. Appl. No. 10/509,578, filed Sep. 29, 2004, Yamada.
U.S. Appl. No. 10/509,688, filed Oct. 12, 2004, Yamada et al.
U.S. Appl. No. 11/340,591, filed Jan. 27, 2006, Ohno et al.
U.S. Appl. No. 11/341,507, filed Jan. 30, 2006, Ohno et al.
U.S. Appl. No. 10/506,247, filed Sep. 9, 2004, Kudo.
U.S. Appl. No. 11/828,894, filed Jul. 26, 2007, Kudo.
U.S. Appl. No. 10/506,247, filed Sep. 9, 2004, Kudo.
U.S. Appl. No. 10/507,375, filed Sep. 21, 2004, Ohno et al.
U.S. Appl. No. 7,196,037, filed Mar. 27, 2007, Ohno et al.
U.S. Appl. No. 7,119,046, filed Oct. 10, 2006, Ohno et al.

* cited by examiner

ΔP= ΔP1+ ΔP2+ ΔP3+ ΔP4 (Equation1)

ΔP1 : resistance due to narrowing of opening in passage

ΔP2 : resistance in the passing through fine pipe

ΔP3 : resistance in the passing through wall

ΔP4 : resistance in the passing through deposited PM

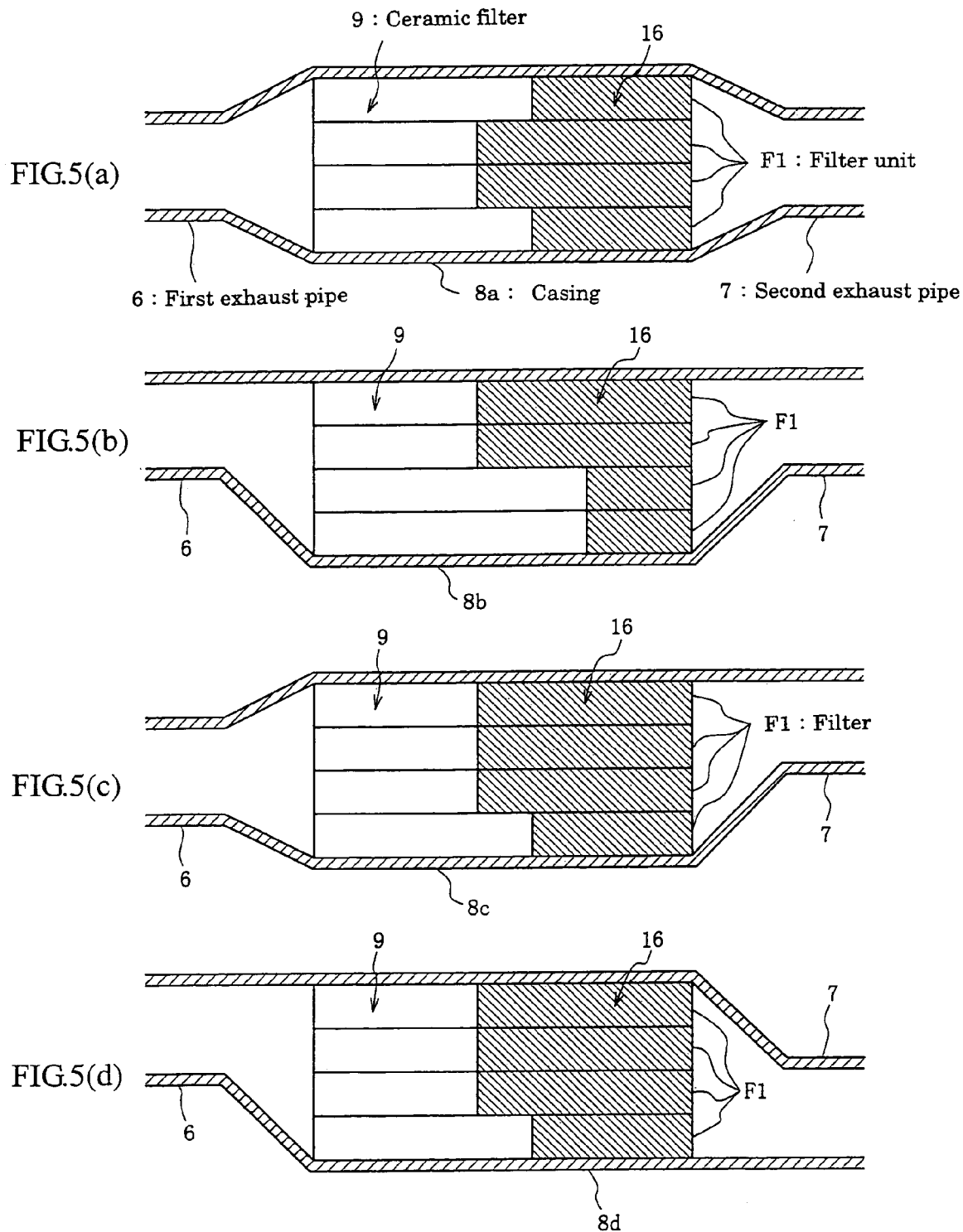

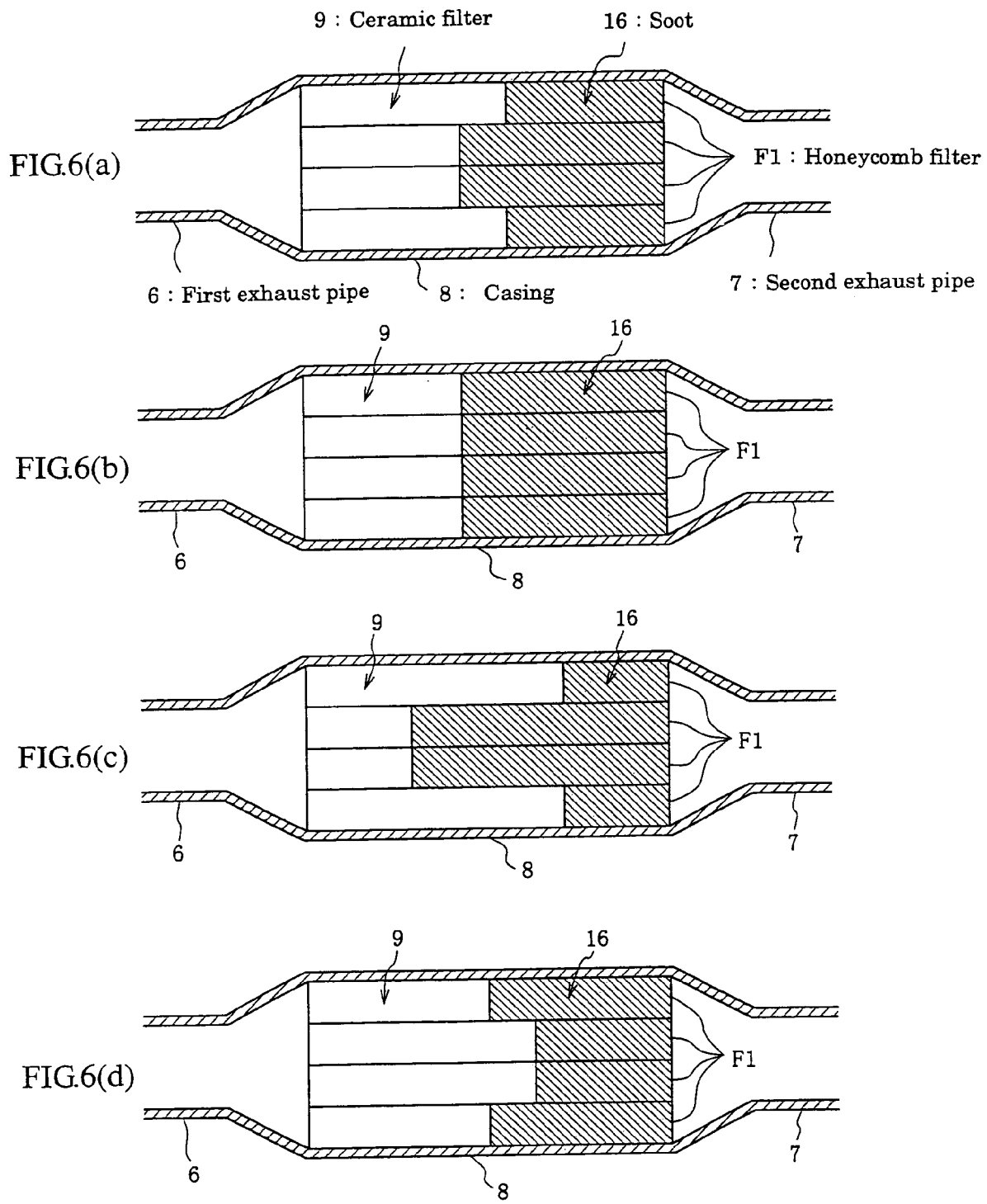

CERAMIC FILTER AND EXHAUST GAS DECONTAMINATION UNIT

INDICATION OF RELATED APPLICATION

This application is an application claiming a priority based on Japanese Patent Application No. 2002-96554 and No. 2002-96906 filed Mar. 29, 2002.

TECHNICAL FIELD

This invention relates to a ceramic filter used in each of places indicating various different characteristics and an apparatus for the purification of exhaust gas using such a filter, and more particularly to a ceramic filter formed by integrally combining a plurality of filter units having different characteristics, or a ceramic filter formed by integrally combining a plurality of filter units having different kinds of catalysts and carrying amounts thereof and an apparatus for the purification for the purification of exhaust gas using such a filter.

BACKGROUND ART

Recently, the number of automobiles is exponentially increasing, and an amount of exhaust gas discharged from an internal engine of the automobile rapidly goes on increasing. Particularly, various substances including in the exhaust gas discharged from a diesel engine are a cause raising air pollution and give a serious influence upon natural environment. Also, there are lately reported study results that particulates in the exhaust gas (diesel particulate) are a cause raising an allergic obstacle and a reduction of spermatozoon number, so that it is an urgent issue for humans to take a countermeasure for removing the particulates in the exhaust gas.

Under such a situation, there have hitherto been proposed various apparatuses for the purification of the exhaust gas. As the general apparatus for the purification of the exhaust gas, there is, for example, a structure that a casing is arranged on the way of an exhaust pipe connected to an exhaust manifold of an engine and a filter having fine holes is arranged therein. As a material constituting the filter, there are metals, alloys and ceramics. As a typical example of the filter made of the ceramic is well-known a cordierite filter. Recently, porous silicon carbide sintered body having such merits that the heat resistance, mechanical strength and catching efficiency are high, and the chemical stability is good, and the pressure loss is low and the like is used as an example of a filter-forming material.

The general ceramic filter and the exhaust gas purification apparatus using the same are such constructed that when the exhaust gas passes through many cells formed along an axial direction of the filter, fine particles in the exhaust gas are trapped in the cell walls to remove the fine particles from the exhaust gas. However, a ceramic filter made of a porous silicon carbide sintered body is generally large in the thermal expansion and weak to thermal shock, so that there is a problem that as the size becomes larger, crack is apt to be easily produced. In this connection, JP-A-8-28246 discloses a ceramic filter being an aggregate formed by combining plural small filter units as a countermeasure for avoiding the breakage due to cracks. This technique is a method wherein a honeycomb shaped body of a square pole (honeycomb unit) is formed by continuously extruding a ceramic raw material through a die of an extrusion shaping machine and cut into an equal length to form cut pieces, and then the cut pieces are sintered to form filter units, and a plurality of such filter units are integrally bundled while adhering outer peripheral faces with each other through a ceramic adhesive to form an aggregate of these filter units as a ceramic filter.

Moreover, the ceramic filter is preferable to be wound on its outer peripheral face with a matt-shaped heat insulating material such as ceramic fibers or the like, and is received in a casing disposed on the way of an exhaust pipe of an automobile or the like at such a state.

In such a filter, as the catching and burning (regeneration) of soot are repeated, there may be caused the scattering of the catching amount of soot in accordance with the position of the ceramic filter.

On the other hand, JP-A-1-145377 proposes a filter of a honeycomb structure in which an average pore size is stepwise or continuously increased from a partition wall of a central portion toward a partition wall of an outer peripheral portion.

The above conventional technique (JP-A-1-145377) aims at only the central portion and the outer peripheral portion. In the ceramic filter having such a structure, when it is arranged in the casing of the exhaust pipe, there may not be carried out the uniform catching and regeneration. That is, a large amount of soot is locally and non-uniformly caught on a part of the filter units and hence the strength as the filter may be lowered in the regeneration or the like. Also, ash content (ash) included in a fuel additive, engine oil or the like is apt to be easily stored on a part of the filter units and hence the service life as the filter may be shortened.

Also, when the aforementioned conventional ceramic filter is used by repeatedly conducting the regeneration over a constant period as a whole, as seen from a graph of a regenerating ratio (a ratio of changing weight before and after the regeneration) shown in FIG. 13, it is confirmed that the soot is surely burnt at an initial stage, but the reactivity as a catalyst is gradually lowered as the regeneration is repeated several times.

In the light of the above problems included in the conventional techniques, it is an object of the invention to provide a ceramic filter in which soot can be equally caught in axial and radial directions of the filter as a whole and it is effective to uniformly conduct the regeneration and the high efficiency of removing the exhaust gas (filter efficiency) can be maintained over a long time and further the durability is excellent.

It is another object of the invention to provide an apparatus for the purification of the exhaust gas using the above ceramic filter having a high filter efficiency and excellent strength and service life.

DISCLOSURE OF THE INVENTION

The inventors have made studies for achieving the above objects and confirmed that the difference in the filter efficiency and the regeneration efficiency is caused dependent upon an arranging place of the ceramic filter. That is, it is confirmed that there is a large difference in the flow amount and the flow rate between a near side and far side of the filter to the exhaust pipe. In general, a casing 8 located downstream side an exhaust manifold of a diesel engine as an internal combustion engine is formed so as to make a diameter of its central section larger than those of a first exhaust pipe and a second exhaust pipe, and the ceramic filter is received in the casing. In case of such a ceramic filter, the gas flow amount is larger in the filter located at a position near to a downstream side end portion of the first exhaust pipe than that in the filter located at a far position (flow rate is faster), and particularly when the second exhaust pipe is located at an opposite side (lower end side), the gas flow amount and the flow rate are more increased.

In this structure, the first exhaust pipe and the second exhaust pipe are connected so as to position at upstream side and downstream side sandwiching the casing, so that the flow amount of the central portion of the ceramic filter becomes large (flow rate is fast) and the flow amount of the peripheral portion thereof is small (flow rate is slow). As a result, the central portion of the filter is largely affected by the gas flown thereinto rather than the peripheral portion thereof. In the invention, therefore, different properties are given to each part in the axial direction of the ceramic filter (gas flowing direction) or a radial direction perpendicular thereto, for example, different kinds of filter units dividing into the central portion having a fast flow rate and the peripheral portion having a slow flow rate are properly combined to form a ceramic filter, whereby there can be obtained the ceramic filter capable of conducting uniform catching and regeneration over a whole of the filter. As one concrete example, it is considered to provide a ceramic filter formed by combining and bundling plural filter units having different pressure loss property, strength, length and the like and integrally adhering them.

The invention is developed under the above idea, and is a ceramic filter having such a basis construction that different properties are applied to a filter made of porous ceramic sintered body having a honeycomb structure every part in a gas flowing direction (axial direction) and/or a radial direction perpendicular thereto.

(A) Particularly, a first embodiment of the invention is a ceramic filter comprising an aggregate formed by combining a plurality of filter units each made of a columnar, porous ceramic sintered body having a honeycomb structure and integrally joining them (so as to bundle in a radial direction), in which said aggregate is constituted by a combination of two or more kinds of the filter units.

In the invention, it is preferable to use filter units having different pressure loss properties as different kinds of the filter unit. As the filter unit having the different pressure loss property, it is preferable to use a combination of one or more kinds of either units having different cell wall thicknesses, units having different porosities, units having different pore sizes and units having different cell structures. Concretely, a filter unit having a large pressure loss is arranged in a portion having a fast gas flow rate and a filter unit having a small pressure loss is arranged in a portion having a slow gas flow rate, and it is preferable to integrally combine them in the following forms.

① A filter unit having a thick cell wall is arranged in the portion having a fast gas flow rate, and a filter unit having a thin cell wall is arranged in the portion having a slow gas flow rate.

② A filter unit having a low porosity is arranged in the portion having a fast gas flow rate, and a filter unit having a high porosity is arranged in the portion having a slow gas flow rate.

③ A filter unit having a small pore size is arranged in the portion having a fast gas flow rate, and a filter unit having a large pore size is arranged in the portion having a slow gas flow rate.

④ A filter unit having a large cell density is arranged in the portion having a fast gas flow rate, and a filter unit having a small cell density is arranged in the portion having a slow gas flow rate.

In the invention, as an example of different kinds of the filter units can be used filter units having different strengths.

It is preferable that a filter unit having a high strength is arranged in the portion having the fast gas flow rate and a filter unit having a low strength is arranged in the portion having a slow gas flow rate, but a case reverse thereto may be conducted.

As an example of the different kinds of the filter units in the invention, filter units having different lengths can be used.

According to the invention of the above construction, when a plurality of at least two kinds of columnar filter units are combined in a direction perpendicular to an axial direction at a bundle state, the combination can be properly changed in accordance with the situation of exhaust gas flown into the ceramic filter as compared with a wholly uniform monolith-type ceramic filter or a ceramic filter consisting of a combination of the same kind of filter units, and hence it is possible to conduct the uniform catching and regeneration without causing displacement at positions of the ceramic filter. Particularly, by combining filter units having different properties, materials or the like in the axial direction or radial direction of the filter, the physical properties such as thermal conductivity and the like can be changed in accordance with the places of the filters and hence the uniform catching and regeneration of the ceramic filter as a whole can be ensured.

For example, by combining a filter unit having a high pressure loss with a filter unit having a low pressure loss can be easily flown the exhaust gas into the filter unit having the low pressure loss. Therefore, the aggregate as the ceramic filter can be more effectively manufactured by arranging the filter unit having a low pressure loss in places having a small flow amount of the exhaust gas.

Under the same keystone as mentioned above, ① the exhaust gas in the ceramic filter can be guided toward a position of low pressure loss by integrally combining a filter unit(s) having a high pressure loss located at a portion having a relatively fast flow rate and a filter unit(s) having a low pressure loss located at a portion having a relatively slow flow rate; ② a filter unit(s) being thin in the wall thickness and easy in the pass of the gas is arranged in place(s) having a small flow amount of the exhaust gas; ③ a filter unit(s) having a thick wall thickness is arranged in a portion having a fast gas flow rate, while a filter unit(s) having a thin wall thickness is arranged in a portion having a slow flow rate, whereby the exhaust gas in the ceramic filter can be guided toward place having a low pressure loss; ④ a filter unit(s) having a high porosity is arranged in place having a small flow amount of the exhaust gas; ⑤ a filter unit(s) having a low porosity is arranged in a portion having a fast flow rate, while a filter unit(s) having a high porosity is arranged in a portion having a slow flow rate, whereby the exhaust gas in the ceramic filter can be guided toward place having a low pressure loss; and ⑥ the filter unit having a large pore size is low in the pressure loss during and after the catching as compared with the filter unit having a small pore size and hence it is effective to arrange the filter unit having a large pore size in place having a small flow amount of the exhaust gas. That is, when a fluid is passed through the ceramic filter, the exhaust gas in the ceramic filter can be guided toward a place having a low pressure loss by combinedly arranging the filter unit having a small pore size in a portion having a relatively fast flow rate and the filter unit having a large pore size in a portion having a relatively slow flow rate.

In the above construction of the invention, as the filtering area of the ceramic filter is made large by fining the cell structure of the filter unit, the pressure loss in and after the catching becomes low. Therefore, the uniform catching can be effectively conducted by arranging the filter unit having a high cell density in a portion having a low flow amount of the exhaust gas.

When the fluid is passed through the above ceramic filter, the filter unit having a large cell density is arranged in the portion having a relatively fast flow rate and the filter unit having a small cell density is arranged in the portion having a relatively slow flow rate, whereby the exhaust gas in the ceramic filter can be guided toward a place in the ceramic filter having a low pressure loss of the exhaust gas.

According to the invention, there can be used filter units having different strengths. That is, a filter unit having a high strength is used in a portion of the ceramic filter subjected to thermal shock, whereby the strength as the aggregate of the ceramic filter can be improved.

During the studies for achieving the above object, the inventors have further made various experiments for solving the cause of the deterioration of the filter performance. For example, there is made a test for increasing a catalyst carrying amount of the filter. In this case, however, the pressure loss of the filter becomes higher and the progress of the deterioration can not be prevented. Then, temperatures at plural places are measured by inserting a thermocouple into the filter to be regenerated. Contrary to expectation, it has been confirmed that a temperature difference is caused in positions of the filter, for example, between the central portion and outer peripheral portion. That is, the temperature of the filter in the central portion is higher than that of the filter in the outer peripheral portion.

Now, the temperature is measured by changing a connecting relationship between the filter and the casing as shown in FIG. 11(a) to FIG. 11(d). In these figures, the reference characters or numbers 600, 650, 700, 750 and 800 indicate temperatures (° C.) in the constant-temperature lines. As a result, the temperature distribution appearing in the filter differs in accordance with the difference in the connecting position between the exhaust pipe and the casing as shown in FIG. 11(a) to FIG. 11(d), and particularly the filter temperature tends to become high in the portion near to the exhaust pipe. Therefore, when conducting the temperature control of the filter, if it is intended to control the temperature to about 600° C. well promoting the reaction of the catalyst, it is confirmed that a portion rendering into a high temperature exceeds 800° C. Also, as the construction of the catalyst itself is examined, it is confirmed that a noble metal used as the catalyst causes sintering (metal changes into large particles) immediately above 800° C. and the reactivity becomes bad and the use thereof is impossible.

From these facts, the inventors have knowledge that when the ceramic filter is constituted with an aggregate of columnar filter units dividable in a radial direction as mentioned above, it is effective to carry different catalysts on the respective columnar filter units or change a carrying amount of the catalyst on the filter unit.

(B) That is, a second embodiment of the invention is a ceramic filter comprising an aggregate formed by combining a plurality of columnar filter units each having a honeycomb structure and made of porous ceramic sintered body through a sealing material layer (preferably a sealing material indicating an adhesiveness: adhesive layer) and integrally joining them, in which the aggregate is constituted by combining two or more kinds of the filter units and a catalyst of different carrying amount or different kind is carried on each of the filter units.

In this embodiment, as the different kinds of the filter units carrying the catalyst of different carrying amount or different kind can be used one or more of the filter units having different pressure loss properties, the filter units having different strengths and the filter units having different lengths as mentioned above.

As the filter units having different pressure loss properties can be used one or more of units having different thicknesses of cell wall, units having different porosities, units having different pore sizes and units having different cell structures.

In the invention, catalysts having different heat resistance or catalytic activities can be used as the different kinds of the catalyst.

As the applying embodiment of the invention, it is preferable that when a high-temperature gas is flown in the ceramic filter, a filter unit carried with a catalyst having a good heat resistance is arranged in a portion having a fast gas flow rate or a large gas flow amount and/or a filter unit carried with a catalyst having a poor heat resistance is arranged in a portion having a slow gas flow rate or a small gas flow amount and they are integrally combined to form a ceramic filter.

Alternatively, it is preferable that when a high-temperature gas is flown in the ceramic filter, a filter unit carried with a catalyst having a large activity is arranged in a portion having a fast gas flow rate or a large gas flow amount and/or a filter unit carried with a catalyst having a small activity is arranged in a portion having a slow gas flow rate or a small gas flow amount.

In the invention, it is further preferable to combine a plurality of filter units having different carrying amounts of the catalyst and integrally join them.

Furthermore, in the invention, it is preferable that when the ceramic filter is set in a casing of an exhaust gas purifying apparatus and a high-temperature gas is flown therein, a filter unit having a small carrying amount of a catalyst is arranged in a portion having a fast gas flow rate or a large gas flow amount and/or a filter unit having a large carrying amount of a catalyst is arranged in a portion having a slow gas flow rate or a small gas flow amount.

In the invention, the ceramic filter may be an aggregate formed by integrally joining a plurality of filter units each made of columnar and porous ceramic sintered body having a honeycomb structure through a sealing material layer, in which the aggregate is constituted with a combination of two or more different kinds of the filter units and the filter units are an integral combination of a unit not carrying the catalyst and a unit carrying at least one kind of catalysts.

In the invention, it is particularly preferable that when the high-temperature gas is flown in the ceramic filter, the filter unit carrying the catalyst is arranged in a portion having a slow gas flow rate or a small flow amount.

The invention having the above construction has the function and effect as mentioned below. That is, in the invention, all of the filter unit fundamentally combined as the ceramic filter do not carry the same catalyst, but the different catalyst is carried every the filter unit, so that there can be provided a ceramic filter suitable for an exhaust gas purifying apparatus of an automobile causing a deflected gas flowing.

For example, an example of arranging catalysts having different heat resistances in accordance with positions in the radial direction of the filter or an example of carrying catalysts having different catalytic activities means that the catalyst most suitable in the use of the ceramic filter is selectively attached to the respective position.

Particularly, when the ceramic filter is set in the casing of the exhaust gas purifying apparatus and the high-temperature exhaust gas is flown thereinto, the filter carried with the catalyst having an excellent heat resistance is used in a portion having a fast flow rate or a large gas flow amount of the exhaust gas, whereby the catalyst in a position exposed to the high-temperature portion can be used over a long time.

Similarly, when the high-temperature gas is flown into the ceramic filter, the regeneration can be efficiently conducted even in a portion of a relatively low temperature by using the filter carried with the catalyst having a large activity in the portion having a slow gas flow rate or a small gas flow amount.

Also, in the invention, the carrying amount of the catalyst may be changed in accordance with the place in the radial direction of the filter (the same catalyst amount may not be carried on the filter). In this case, it is possible to adjust the catalyst weight or density to be carried on the filter in the use of the ceramic filter. According to such a structure, it is not necessary to carry the same catalyst amount on the ceramic filter. In the use of the ceramic filter, therefore, it is possible to arrange the filter unit having catalyst weight and density adjusted to a large level in a portion having a relatively low temperature and arrange the filter unit having catalyst weight and density adjusted to a small level in a portion having reversely a relatively high temperature.

Further, according to the invention, the aggregate of the ceramic filter can be formed by using both a filter unit carried with the catalyst and a filter unit not carried with the catalyst. Thus, the filter unit having no catalyst can be used in a portion promoting the regeneration of soot without the catalyst at a relatively high temperature, while the filter unit having the catalyst can be used in a portion requiring the catalyst effect at a relatively low temperature.

In this case, it is possible to arrange the filter unit having the catalyst in a portion having a small flow amount of the exhaust gas and being relatively low in the temperature and reversely arrange the filter unit having no catalyst in a portion having a large flow amount of the exhaust gas and being relatively high in the temperature in the use of the ceramic filter.

According to the invention, the ceramic filter having the above properties can be interposed between the first and second exhaust pipes to form an exhaust gas purifying apparatus having a high strength and capable of using over a long time.

Furthermore, according to the invention, when the fluid is passed through the ceramic filter, a filter unit having a high strength arranged in a portion having a relatively fast flow rate and a filter unit having a low strength arranged in a portion having a relatively slow flow rate are integrally combined, whereby there can be provided a ceramic filter capable of coping with the rapid temperature change of the exhaust gas.

In addition, according to the invention, when the fluid is passed through the ceramic filter, a filter unit having a low strength arranged in a portion having a relatively fast flow rate and a filter unit having a high strength arranged in a portion having a relatively slow flow rate are integrally combined, whereby there can be provided a ceramic filter capable of coping with the temperature change generated when abnormal burning is caused due to unburnt soot in the portion having the slow flow rate. These ceramic filters can be properly selected and used in accordance with the specification of the engine and the regeneration system.

Further, according to the invention, the ceramic filter may be formed by changing a filter length and arranging a filter unit having a short length in a portion having a small catching amount of soot. In the ceramic filter having such a construction, the position of soot amount from front edge face can be made same. As a result, the aggregate of the filters can promote the catching of soot and regeneration as whole.

Moreover, in the invention, a ceramic filter having a high filtering efficiency, a low pressure loss and excellent heat resistance and thermal conductivity can be provided by using a porous silicon carbide sintered body as a material for the ceramic filter.

(C) As a third embodiment of the invention, there is proposed an exhaust gas purifying apparatus having a high strength and capable of using over a long time by interposing and arranging various ceramic filters having different properties in an axial direction and/or a radial direction in a casing between first and second exhaust pipes.

BRIEF DESCRIPTION OF DRAWINGS

FIGS. 5(a) to 5(d) are graphs showing results of Reference Example indicating a difference of soot catching amount in accordance with a difference of arranging positions of a casing and an exhaust pipe.

FIGS. 6(a) to 6(d) are graphs showing results of Comparative example indicating a difference of soot storing amount by changing a shape of a filter.

BEST MODE FOR CARRYING OUT THE INVENTION

An exhaust gas purifying apparatus 1 for a diesel engine as an embodiment of the invention and a ceramic filter used therefor are explained with reference to FIG. 1 to FIGS. 12(a) and 12(b) below.

Figure 1:
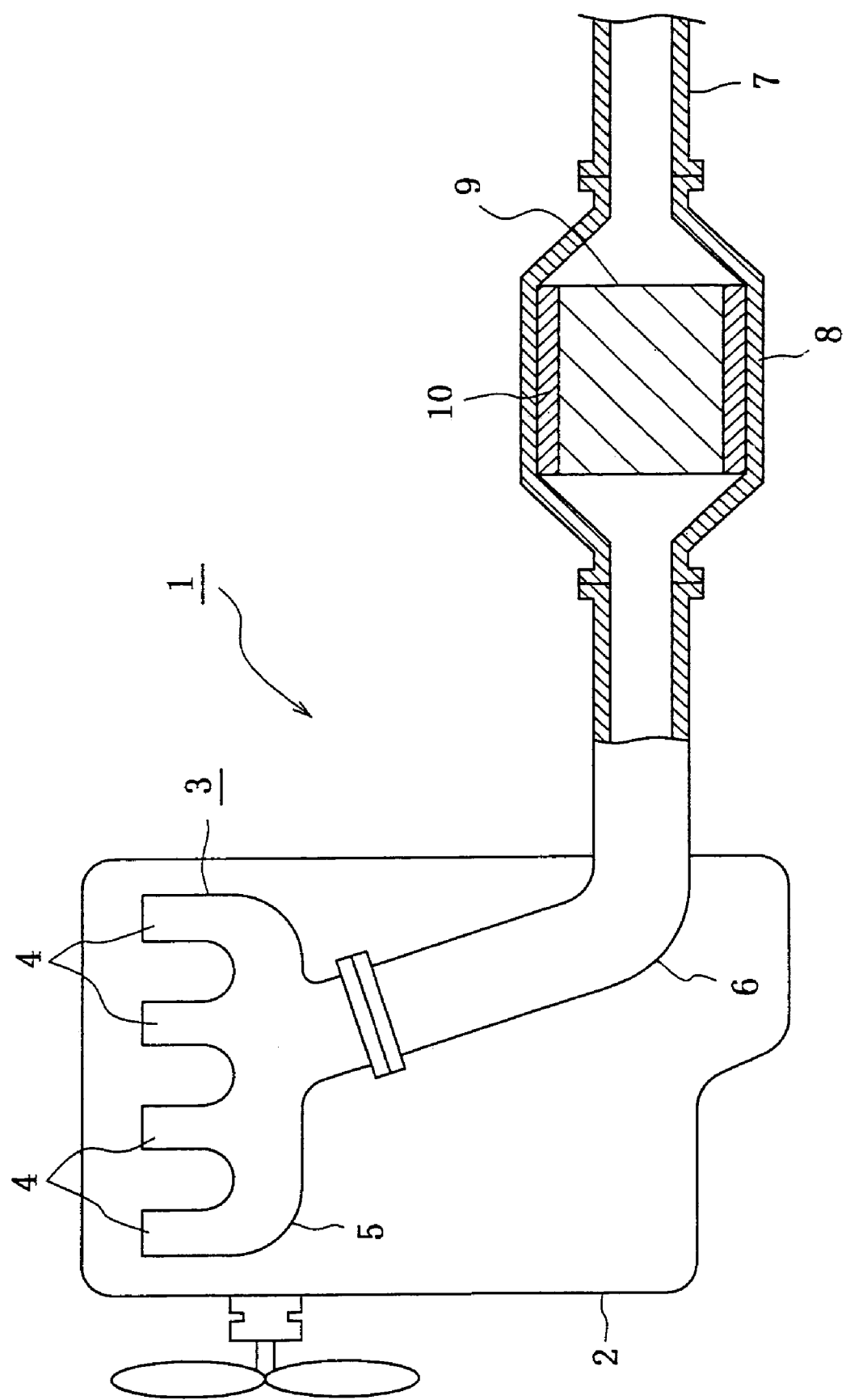
FIG. 1 is a schematic view illustrating an example of the exhaust gas purifying apparatus.

The exhaust gas purifying apparatus 1 shown in FIG. 1 is an apparatus for purifying an exhaust gas discharged from a diesel engine 2 as an internal combustion engine. The diesel engine 2 comprises plural cylinders not shown, and each cylinder is connected to a branched part 4 of an exhaust manifold 3 made of a metallic material. Each branched part 4 is joined to a main body 5 of the manifold. Therefore, exhaust gas discharged from the each cylinder is collected to the manifold main body.

To a downstream side of the exhaust manifold 3 are arranged a first exhaust pipe 6 and a second exhaust pipe 7 each made of a metallic material. An end portion of an upstream side of the first exhaust pipe 6 is connected to the manifold main body 5, and a cylindrical casing 8 made of a metallic material is arranged between the first exhaust pipe 6 and the second exhaust pipe 7. That is, an end portion of an upstream side of the casing 8 is connected to an end portion of a downstream side of the first exhaust pipe 6, and an end portion of a downstream side of the casing 8 is connected to an end portion of an upstream side of the second exhaust pipe 7. In other words, the casing 8 is arranged at an interposing state between the exhaust pipes 6, 7. As a result, internal regions of the first exhaust pipe 6, casing 8 and second exhaust pipe 7 are communicated with each other and an exhaust gas is flown thereinto. A section at a central portion of the casing 8 is made larger than diameters of the exhaust pipes 6, 7, so that the internal region of the casing 8 is wider than the internal regions of the exhaust pipes 6, 7. In the casing 8 is received a ceramic filter 9.

A heat insulating material 10 is interposed between an outer peripheral face of the ceramic filter 9 and an inner peripheral face of the casing 8. The heat insulating material 10 is a matt containing ceramic fibers and has a thickness of 2 mm-60 mm. It is desirable that the heat insulating material 10 has an elastic structure and a function of releasing heat stress. The heat insulating material prevents the escape of heat from the outermost peripheral portion of the filter 9, whereby energy loss in the regeneration can be suppressed to a minimum, and also since it has the elastic structure, the shifting of the position of the ceramic filter 9 due to the pressure of the exhaust gas and the vibration during the running can be prevented.

Figure 2:
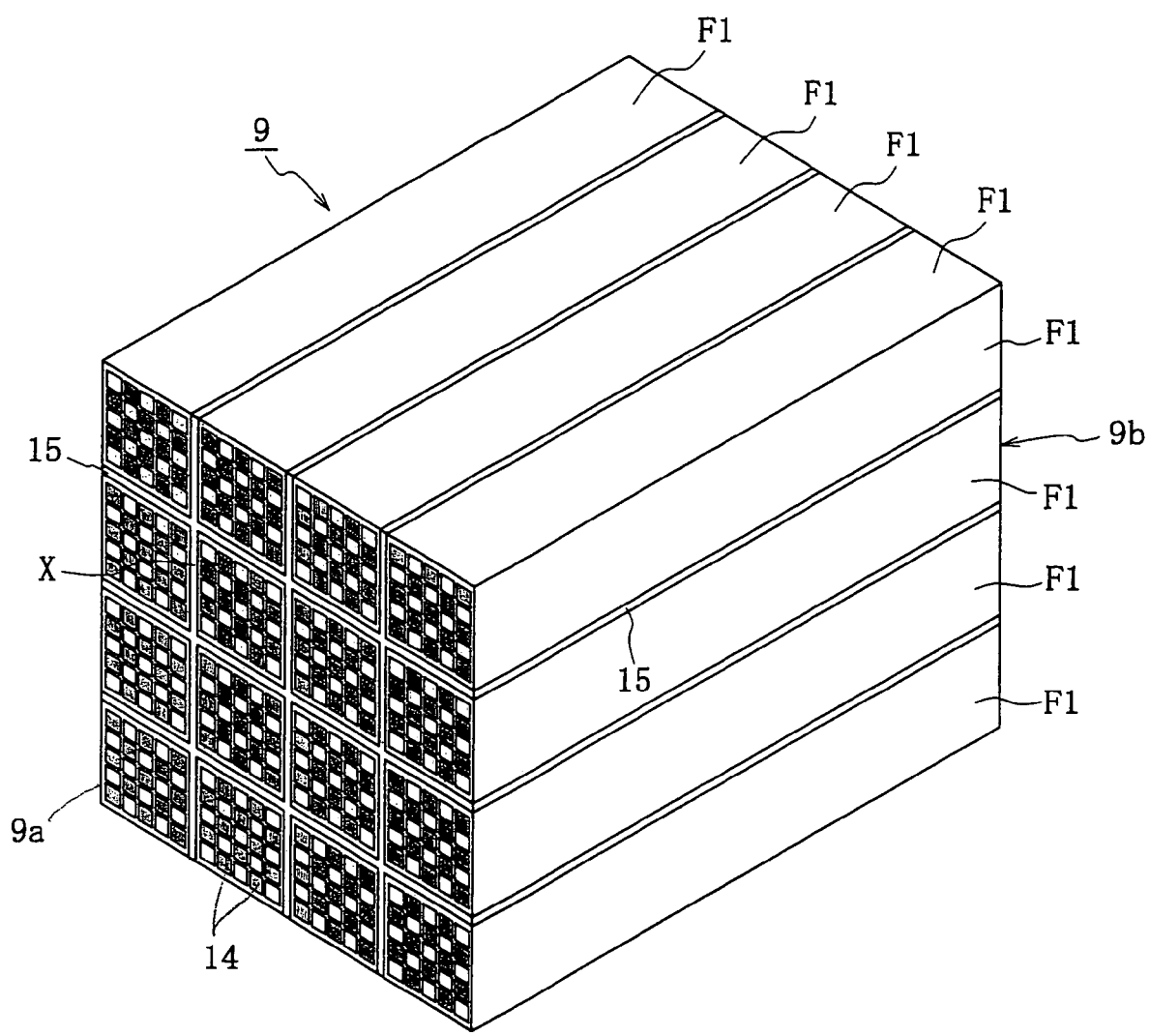
FIG. 2 is a perspective view of a block formed by combining filter units.

In this embodiment, a main application of the ceramic filter 9 is a diesel particulate filter (DPF) for removing diesel particulates in the exhaust gas discharged from the diesel engine. A block 9 constituting the filter shown in FIG. 2 is formed by bundling a plurality of ceramic filter units F1 having a honeycomb structure so as to combine faces perpendicular to an axial direction with each other and integrally uniting them to form an aggregate (block). A filter unit F1 positioned in a central portion of the aggregate is quadratic prism-shaped, an outer size of which is 33 mm×33 mm×150 mm. In the illustrated embodiment, quadratic prism-shaped filter units F1 are bundled in 4 rows and 4 columns, i.e. a total of 16 units to form a quadratic prism-shaped aggregate (ceramic filter) of honeycomb filter units as a whole.

These filter units F1 are preferable to be made of a porous silicon carbide sintered body. Because, the silicon carbide sintered body is excellent in the heat resistance and thermal conductivity as compared with the other ceramics. Of course, sintered bodies of silicon nitride, sialon, alumina, cordierite, mullite and the like can be used as a sintered body other than silicon carbide. Further, as the unit F1 can be used a silicon-containing ceramic formed by compounding metallic silicon with the above ceramic, or a ceramic bonded with silicon or a silicate compound.

Also, each of these filter units F1 is provided with a honeycomb structure, so that there is an advantage that even when the catching amount of particulates increases, the pressure loss is small. In each of the filter units F1 are regularly formed plural through-holes 12 having substantially a quadrate at section along an axial direction of the unit. The through-holes 12 are partitioned with each other through thin cell walls 13, and an oxidation catalyst consisting of an element of platinum group (e.g. Pt or the like) or the other metal element or an oxide thereof is carried on the cell wall 13. Of course, a catalyst purifying Ca, HC, Nox or the like may be carried, or a rare earth element, alkaline earth metal, alkali metal, transition metal may be carried.

Figure 3:
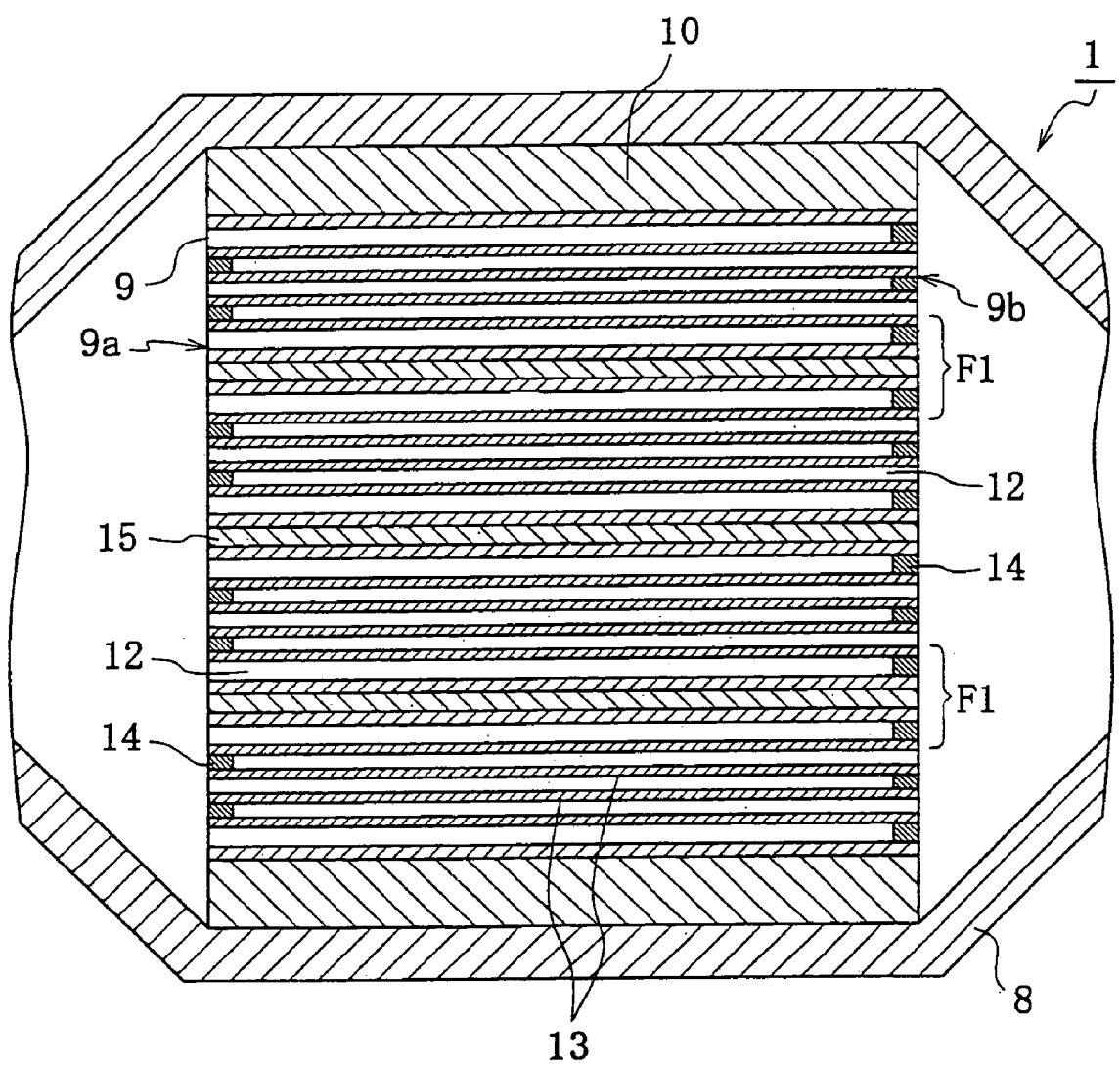
FIG. 3 is an enlarged section view of a main part of an exhaust gas purifying apparatus.
Figure 4:
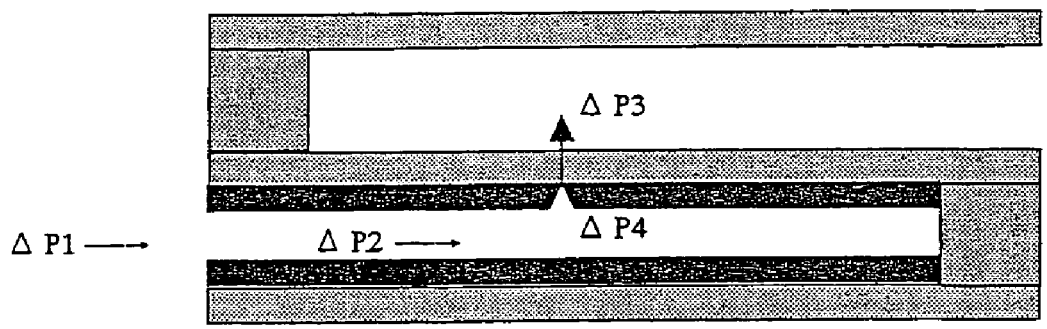
FIG. 4 is an explanatory view of a pressure loss property.

As shown in FIG. 3, opening portions of each through-hole 12 are sealed with a plug 14 (porous silicon carbide sintered body in this embodiment) at either one of end faces 9a, 9b, and viewing the whole of the end faces 9a, 9b, the opening portions and the sealed portions are constructed so as to indicate a checkered pattern.

As a result, the filter unit F1 is at a state of constituting with many cells having a quadratic form at section. In such a cell structure, a density of the cells is about 100-400 cells/inch square and a thickness of the cell wall 13 is about 0.05-0.5 mm.

Moreover, the cell structure is generally represented by dividing the thickness of the cell wall 13 as a unit of mil (1 mil is 0.0254 mm) by the cell density. That is, the above example is represented by 14/200. Therefore, about a half of many cells are opened at the upstream side end faces 9a, and the remaining half are opened at the downstream side end faces 9b.

In the filter unit F1, the average pore size is 1 μm-50 μm, preferably about 5 μm-20 μm. When the average pore size is less than 1 μM, the clogging of the filter unit F1 due to the deposition of the particulates becomes conspicuous. While, when the average pore size exceeds 50 μm, fine particulates can not be caught and the filtering ability lowers.

The porosity of the filter unit F1 is 30%-80%, preferably 35%-70%. When the porosity is less than 30%, the unit becomes too dense and there is a fear that the exhaust gas can not be flown into the interior of the unit. While, when the porosity exceeds 80%, the pores in the filter unit F1 becomes too large and there is a fear that the strength becomes weak and the catching efficiency of the particulates lowers.

In the ceramic filter 9 placed in the casing as shown in FIG. 3, outer peripheral faces of 16 ceramic filters 9 in total are adhered with each other through ceramic sealing materials (preferably using an adhesion sealing material (adhesive)) 15. The sealing material layer 15 is preferable to have a thickness of about 0.3 mm-3 mm, further preferably 0.5 mm-2 mm. When the thickness is exceeds 3 mm, even if the thermal conductivity is high, the sealing material layer 15 is still a large heat resistor and hence the thermal conduction between the filter units F1 is obstructed. Also, a ratio of the filter unit F1 portion occupied in the ceramic filter 9 is relatively decreased to bring about the lowering of the filtering ability. Inversely, when the thickness of the sealing material layer 15 is less than 0.3 mm, the large heat resistor is not formed, but the adhesion property between the filter units F1 is lacking and the ceramic filter 9 is easily broken.

The sealing material layer 15 is made of, for example, inorganic fibers, an inorganic binder, an organic binder and inorganic particles, and is desirable to be made of an elastic material formed by binding three-dimensionally crossed inorganic fibers and inorganic particles through the inorganic binder and organic binder. As the inorganic fiber may be used one or more ceramic fibers selected from silica-alumina fibers, mullite fibers, alumina fibers and silica fibers. Among them, the use of the silica-alumina ceramic fibers is desirable. Because, the silica-alumina ceramic fiber is excellent in the elasticity and has an action of absorbing heat stress.

In this case, the content of the silica-alumina ceramic fibers occupied in the sealing material layer 15 is 10% by weight-70% by weight, preferably 10% by weight-40% by weight, more preferably 20% by weight-30% by weight as a solid content. When the content is less than 10% by weight, the function and effect as the elastic body lower. While, when the content exceeds 70% by weight, not only the thermal conductivity but also the elasticity lower.

The silica-alumina ceramic fiber is preferable to contain shots of 1% by weight-10% by weight, preferably 1% by weight-5% by weight, more preferably 1% by weight-3% by weight. When the shot content is less than 1% by weight, the production is difficult, while when it exceeds 50% by weight, The outer peripheral face of the filter unit F1 is damaged.

The silica-alumina ceramic fiber has a fiber length of 1 mm-100 mm, preferably 1 mm-50 mm, more preferably 1 mm-20 mm. When the fiber length is less than 1 mm, the elastic structural body can not be formed, while when the fiber length exceeds 100 mm, the fibers are pilled and the dispersibility of the inorganic particles is deteriorated, and further it is difficult to thin the sealing material layer 15 to not more than 3 mm and hence it is not attempted to improve the thermal conduction between the filter units F1.

As the inorganic binder included in the sealing material layer 15 is desirable at least one colloidal sol selected from silica sol and alumina sol. Particularly, it is desirable to select the silica sol. Because, the silica sol is available and easily changes into $SiO_2$ through firing and is suitable as an adhesive at a high temperature region. Also, the silica sol is excellent in the insulating property.

Furthermore, the content of the silica sol in the sealing material layer 15 is 1% by weight-30% by weight, preferably 1% by weight-15% by weight, more preferably 5% by weight-9% by weight as a solid content. When the content is less than 1% by weight, the adhesion strength lowers, while when the content exceeds 30% by weight, the thermal conductivity largely lowers.

As the organic binder contained in the sealing material layer 15, a hydrophilic organic high polymer is preferable, and at least one polysaccharide selected from polyvinyl alcohol, methylcellulose, ethylcellulose and carboxymethyl cellulose is more preferable. Among them, it is desirable to select carboxymethyl cellulose. Because, carboxymethyl cellulose gives a preferable fluidity to the sealing material layer and indicates an excellent adhesiveness at a room temperature region. In this case, the content of the carboxymethyl cellulose in the adhesive layer is 0.1% by weight-5.0% by weight, preferably 0.2% by weight-1.0% by weight, more preferably 0.4% by weight-0.6% by weight as a solid content. When the content is less than 0.1% by weight, migration can not be sufficiently controlled.

Moreover, the term "migration" used herein means a phenomenon that in case of curing the sealing material layer filled between bodies to be adhered, the binder moves accompanied with the removal of the solvent through drying. While, when the content exceeds 5.0% by weight, the organic binder burns out at a higher temperature and the strength of the sealing material layer 15 lowers.

As the inorganic particles included in the sealing material layer 15 is preferable an elastic material using one or more inorganic powder or whisker selected from silicon carbide, silicon nitride and boron nitride. Such carbide and nitride are very large in the thermal conductivity and contribute to improve the thermal conduction owing to the inclusion on a surface of the ceramic fiber or a surface of the colloidal sol and interiors thereof. Among the inorganic powder of the carbide and nitride, it is desirable to select silicon carbide powder. Because, silicon carbide is very high in the thermal conductivity and has a property of being easily familiar with the ceramic fiber. Further, the filter unit F1 as a body to be adhered is the same kind, i.e. porous silicon carbide in this embodiment.

In this case, the content of silicon carbide powder is 3% by weight-80% by weight, preferably 10% by weight-60% by weight, more preferably 20% by weight-40% by weight as a solid content. When the content is less than 3% by weight, the thermal conductivity of the sealing material layer 15 lowers and hence the sealing material layer 15 becomes still a large heat resistor. While, when the content exceeds 80% by weight, the adhesion strength at high temperatures lowers.

In the silicon carbide powder, the particle size is 0.01 μm-100 μm, preferably 0.1 μm-15 μm, more preferably 0.1 μm-10 μm. When the particle size exceeds 100 μm, the adhesion force and thermal conductivity lower, while when the particle size is less than 0.01 μm, the cost of the sealing material layer 15 increases.

The production method of the above ceramic filter is described below.

①At first, there are previously provided a ceramic starting slurry used in an extrusion shaping step, a plug paste used in an end face sealing step, and a sealing material paste used in a filter adhering step. The ceramic starting paste is used by compounding given amounts of an organic binder and water with silicon carbide powder and mixing them. The plug paste is used by compounding an organic binder, a lubricant, a plasticizer and water with silicon carbide powder and mixing them. The paste for the formation of the sealing material layer is used by compounding given amounts of inorganic fibers, an inorganic binder, an organic binder, inorganic particles and water and mixing them.

②Then, the ceramic starting slurry is charged into an extrusion shaping machine and continuously extruded into a mold. Thereafter, the extruded honeycomb shaped body is cut at an equal length to obtain cut pieces of a quadratic, columnar honeycomb shaped body. Thereafter, a given amount of the plug paste is filled in one-sided opening portion of a cell of the cut piece to seal both end faces of each of the cut pieces.

③Next, the firing is carried out under given conditions of temperature, time and the like to completely sinter the cut pieces of the honeycomb shaped body and the plug 14. Moreover, in order to provide an average pore size of 6 μm-15 μm and a porosity of 35%-70%, the firing temperature is set to 2100° C.-2300° C. and the firing time is set to 0.1 hour-5 hours, and an atmosphere inside a furnace in the firing is an inert atmosphere and a pressure of the atmosphere is an ordinary pressure.

④If necessary, an underground layer made of a ceramic is formed on an outer peripheral face of the honeycomb filter unit F1, and thereafter the paste for the formation of the sealing material layer is applied thereonto. The thus obtained filter unit F1 is used in total of 16 units and their outer peripheral faces are adhered with each other to form a columnar aggregate as an objective ceramic filter. Of course, the ceramic filter may be subjected to a working into a target shape such as column, ellipsoid or the like and coated with a sealing material.

Next, an action of catching particulates through the ceramic filter 9 received in the casing 8 will be described. In the ceramic filter 9, the exhaust gas is fed from a side of the upstream side end face 9a. That is, the exhaust gas flown from the first exhaust pipe 6 first flows into the cell opening to the upstream side end face 9a of the ceramic filter. Then, the exhaust gas passes through the cell wall 13 and flows into the adjoining other cell (i.e. adjoining cell at a side opening to the downstream side end face 9*b*), which is discharged from the opening downstream side end face 9*b*. In such a flowing of the gas, particulates included in the exhaust gas (diesel particulate) can not pass through the cell wall 13, so that they are trapped on the surface of the cell wall 13 as they are. As a result, the purified exhaust gas is discharged from the downstream side end face 9*b* of each filter unit F1. Then, the purified exhaust gas passes through the second exhaust pipe 7 and is finally discharged into air.

Moreover, the particulates trapped by the cell wall 13 are burnt out by the action of the catalyst when the internal temperature of the ceramic filter 9 reaches to a given temperature.

Then, the ceramic filter (A) according to the invention is described with respect to an example of the aggregate formed by combining filter units F1 having different properties in the radial direction of the filter, e.g. different pressure loss properties, but the invention is not limited to this example.

In general, the pressure loss property when the exhaust gas passes through the cell wall 13 is considered as follows. The pressure loss when the diesel exhaust gas passes through the filter unit F1 can be shown in FIG. 4. In this case, resistances $\Delta P1$, $\Delta P2$ and $\Delta P3$ are values dependent upon the cell structure of the filter unit F1, respectively, and a total value of $\Delta pi=(\Delta P1+\Delta P2+\Delta P3)$ is a constant value not dependent upon the deposited amount and time of the diesel particulates, which is called as an initial pressure loss. On the other hand, $\Delta P4$ is a resistance when the diesel particulates pass through the cell wall 13 of the filter unit F1 after the deposition, which is a value corresponding to 2-3 times or more of the initial pressure loss.

① When the cell wall 13 is thickened, the resistance $\Delta P3$ passing through the cell wall 13 increases as the pressure loss. Further, the opening becomes small and hence $\Delta P1$ becomes large. As a result, the pressure loss becomes considerably large as compared with the filter having a thin cell wall 13, and the tendency thereof becomes more conspicuous when the particulates are deposited on the filter.

② In case of increasing the porosity, the resistance $\Delta P3$ passing through the cell wall 3 lowers as the pressure loss. Therefore, the pressure loss becomes small as compared with the filter having a low porosity, and the tendency thereof becomes more conspicuous when the particulates are deposited on the filter.

③ In case of increasing the pore size, the resistance $\Delta P3$ passing through the cell wall 13 lowers as the pressure loss. Therefore, the pressure loss becomes small as compared with the filter having a low pore size, and the tendency thereof becomes more conspicuous when the particulates are deposited on the filter.

④ In case of making the cell density large, the resistance $\Delta P1$ based on the narrowing of the opening in each cell path and the resistance $\Delta P2$ passing through the fine pipe increases as the pressure loss. However, the resistance $\Delta P4$ in case of passing the deposited soot considerably lowers, so that the pressure loss becomes small as compared with the filter having a low cell density.

In the invention, therefore, it is considered to combine different kinds of filter units F1 (cell wall thickness, porosity, pore size, cell structure) in accordance with loss property of each filter unit F1 constituting the ceramic filter 9. For example, the filter unit F1 having a large pressure loss is arranged in a portion having a fast gas flow rate and the filter unit F1 having a small pressure loss is arranged in a portion having a slow gas flow rate, and they are integrally combined. Concrete examples thereof are mentioned as follows.

① A filter unit having a thick cell wall is arranged in the portion having a fast gas flow rate, and a filter unit having a thin cell wall is arranged in the portion having a slow gas flow rate.

② A filter having a low porosity is arranged in the portion having a fast gas flow rate, and a filter unit having a high porosity is arranged in the portion having a slow gas flow rate.

③ A filter unit having a small pore size is arranged in the portion having a fast gas flow rate, and a filter unit having a large pore size is arranged in the portion having a slow gas flow rate.

④ A filter unit having a large cell density is arranged in the portion having a fast gas flow rate, and a filter unit having a small cell density is arranged in the portion having a slow gas flow rate.

Also, in the invention, filter units having different strengths can be used as an example of different kinds of filter units F1. In this case, a filter unit having a high strength is arranged in the portion having a fast gas flow rate and a filter unit having a low strength is arranged in the portion having a slow gas flow rate in accordance with the specification of the engine and the regeneration system, or the arrangement of these filter units is opposite, so that the combination thereof can be properly selected.

Furthermore, in the invention, honeycomb filters having different lengths can be used as an example of different kinds of the filter units F1.

Then, the ceramic filter (B) according to the invention is described with respect to an example of the aggregate formed by combining filter units F1 having different kinds of catalyst carried on the filter unit F1 and/or different carrying amounts, but the invention is not limited to this example. The catalyst formed on the each filter unit F1 is described below.

Figure 8A:
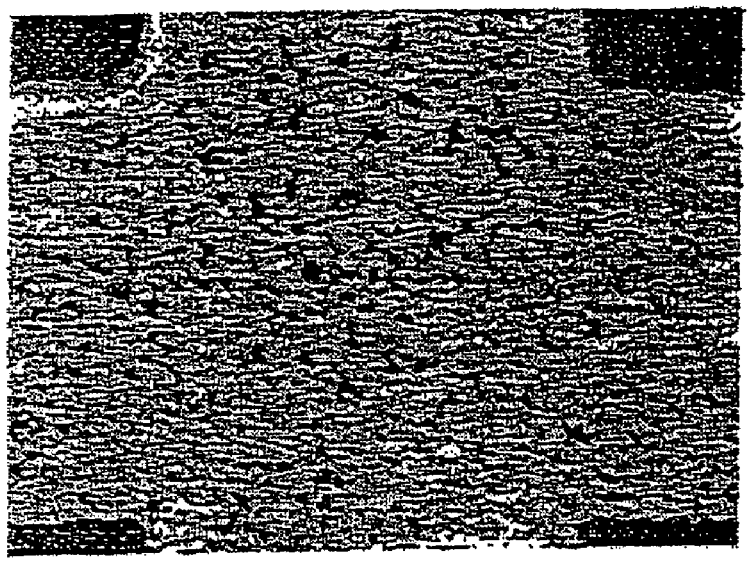
FIGS. 8(a) to 8(c) are views showing an example of carrying alumina on a ceramic filter of an embodiment of the invention.
Figure 8B:
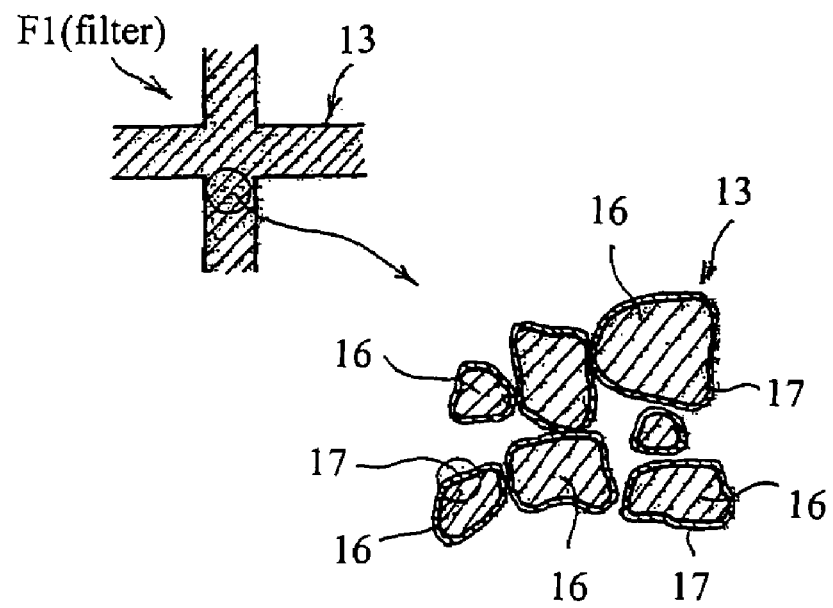
Figure 8C:
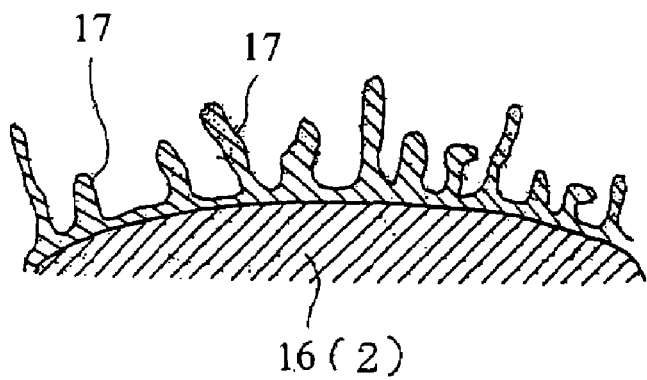

The catalyst used in the invention (B) as shown in FIGS. 8(*a*) to 8(*c*) is preferable to be a rare earth oxide-containing alumina film 17 separately coating the surface of each SiC particle 16 with respect to SiC particles 16 of SiC sintered body constituting the cell walls 13 partitioning each cell of the filter unit F1.

In general, alumina has a high specific surface area and is suitable as a catalyst carrying film. Particularly, it is desirable to develop filter units F1 stably acting at a higher temperature and having a high heat resistance at the present time, and the alumina film 17 is required to have a higher heat resistance accompanied therewith.

In the invention, in order to improve the alumina film, ① the shape of each alumina particle is rendered into a small fiber and ② a rare earth oxide such as ceria (cerium oxide) or the like is included therein. Particularly, by adopting the structure of the former ① can be reduced contact points between alumina particles and the sintering rate can be lowered to suppress the growth of particles and make the specific surface area large to thereby improve the heat resistance. That is, in this embodiment, the alumina film 17 covering the surface of each SiC particle in the filter unit F1 shows a hair implant structure that alumina particles stand up in form of small fibers at a microscopic section. In such a filter unit F1, therefore, the heat resistance is considerably improved because the contact points between adjoining alumina small fibers is reduced. In the latter ②, the heat resistance is improved by adding ceria or the like. This is due to the fact that a new compound is formed on the surfaces of the crystal particles constituting the alumina film 17 to obstruct the growth of alumina particles.

In this embodiment, SiC or $SiO_2$ existing on an extreme surface layer thereof feeds Si in the heat treatment to shut off a mass transfer course, whereby the heat resistance is improved. According to the inventors' studies, it is confirmed that when SiC is intentionally treated at a high temperature to form an oxide, the heat resistance is further improved.

The regeneration property of the alumina film 17 is described below. The alumina film 17 is obtained by adding a rare earth oxide such as ceria ($CeO_2$) or lanthana ($La_2O_3$) in an amount of about 10-80 mass %, preferably 20-40 mass % based on $Al_2O_3$ and uniformly dispersing the oxide into the surface or interior of the alumina film 17. As ceria or the like is added to the alumina film 17 (it is desirable to add a catalyst such as Pt or the like together), the feeding of oxygen into the exhaust gas is activated by an action of adjusting oxygen concentration inherent to ceria, whereby the efficiency of burning and removing "soot (diesel particulates) adhered to the filter unit F1 is improved and hence the regeneration ratio of the filter unit F1 is considerably improved. Also, the durability of the filter unit F1 can be improved.

That is, the rare earth oxide such as ceria or the like improves the heat resistance of alumina but also plays a role of adjusting the oxygen concentration on the surface of the filter unit F1. In general, hydrocarbon or carbon monooxide existing in the exhaust gas is removed by oxidation reaction and NOx is removed by reducing reaction. Ceria added to the catalyst is relatively low in the redox potential of $Ce^{3+}$ and $Ce^{4+}$ and reversibly promotes a reaction of $2CeO_2 \leftrightarrows Ce_2O_3 + 1/2O_2$. That is, when the exhaust gas renders into a rich region, the above reaction proceeds to the right to feed oxygen into an atmosphere, while when it renders into a lean region, the reaction proceeds to the left to occlude extra oxygen in the atmosphere. Thus, the ceria adjusts the oxygen concentration in the atmosphere and takes an action of widening a width of an air-fuel ratio so as to efficiently remove hydrocarbon, carbon monooxide or NOx.

On the contrary, the catalyst containing no $CeO_2$ oxidizes soot by activating oxygen in the exhaust gas. This reaction is poor in the efficiency because oxygen in the fluid should be activated.

On the other hand, the catalyst containing $CeO_2$ feeds oxygen by the following reaction formula:

$$CeO_2 \leftrightarrows CeO_{2-x} + x/2O_2$$

That is, oxygen discharged into the atmosphere and oxygen in the exhaust gas are activated by the catalyst (noble metal) and reacted with soot (carbon) to form $CO_2$ ($CeO_{2-x}$ is oxidized to original $CeO_2$). Also, $CeO_2$ and soot directly contact with each other, so that even if the oxygen amount discharged is small, the soot can be efficiently oxidized.

Further, $CeO_2$ increases OSC (oxygen storing capacity) owing to the carrying of the catalyst (noble metal). Because, the catalyst (noble metal) activates oxygen in the exhaust gas and activates oxygen on the surface of $CeO_2$ near to noble metal, and the OSC is increased.

Moreover, as the rare earth oxide, it is preferable to use a composite oxide of rare earth element and zirconium in addition to the above single oxide ($CeO_2$). In this case, it is considered that when zirconium oxide is included in the rare earth oxide, the grain growth of the rare earth oxide is suppressed to improve the controlling property of oxygen concentration.

In the rare earth oxide forming a composite oxide with zirconium, the particle size is preferably about 1-30 nm, more preferably 2-20 nm. When the particle size is less than 1 nm, it is difficult to produce the composite oxide. While, when the particle size exceeds 30 nm, the particles easily cause the sintering and hence the surface area of the particles becomes small and the contact area with the exhaust gas becomes small and there is a problem that the activity is weak. Further, there is feared that the pressure loss in the pass of the exhaust gas becomes large.

Onto the filter unit F1 showing a state that the surface of the filter unit F1 is apparently coated with the alumina film (carrying film) 17 by independently covering each surface of the SiC particles 16 with the alumina film 17 is carried a noble metal or an element selected from elements of Group VIa and VIII in the Periodic Table as a catalyst. As such an element are concretely mentioned platinum (Pt), palladium (Pd), rhodium (Rh), nickel (Ni), cobalt (Co), molybdenum (Mo), tungsten (W), cerium (Ce), copper (Cu), vanadium (V), iron (Fe), gold (Au), silver (Ag) and the like.

As the catalyst, therefore, at least one element selected from Pt, Au, Ag and Cu as a noble metal, Mo, W as an element of Group VIa, Fe, Co, Pd, Rh, Ni as an element of Group VIII and V, Ce as an element other the above in the Periodic Table or a compound thereof may be carried on the alumina film 17.

For example, a binary alloy or a ternary alloy based on a combination of the above elements is used as the compound. It is advantageous to use such an alloy together with the rare earth oxide such as ceria, lanthana or the like acting as a co-catalyst as mentioned above. The thus formed filter unit F1 is less in the deterioration due to poisoning (lead poisoning, phosphorus poisoning, sulfur poisoning) and small in the thermal deterioration and excellent in the durability. Moreover, compounds based on a combination with the other element (oxide, nitride or carbide) may be used in addition to the alloy of the above combination.

Incidentally, the binary alloy includes Pt/Pd, Pt/Rh, Pt/Ni, Pt/Co, Pt/Mo, Pt/W, Pt/Ce, Pt/Cu, Pt/V, Pt/Fe, Pt/Au, Pt/Ag, Pd/Rh, Pd/Ni, Pd/Co, Pd/Mo/Pd/W, Pd/Ce, Pd/Cu, Pd/V, Pd/Fe, Pd/Au, Pd/Ag, Rh/Ni, Rh/Co, Rh/Mo, Rh/W, Rh/Ce, Rh/Cu, Rh/V, Rh/Fe, Rh/Au, Rh/Ag, Ni/Co, Ni/Mo, Ni/W, Ni/Ce, Ni/Cu, Ni/V, Ni/Fe, Ni/Au, Ni/Ag, Co/Mo, Co/W, Co/Ce, Co/Cu, Co/V, Co/Fe, Co/Au, Co/Ag, Mo/W, Mo/Ce, Mo/Cu, Mo/V, Mo/Fe, Mo/Au, Mo/Ag, W/Ce, W/Cu, W/V, W/Fe, W/Au, W/Ag, Ce/Cu, Ce/V, Ce/Fe, Ce/Au, Ce/Ag, Cu/V, Cu/Fe, Cu/Au, Cu/Ag, V/Fe, V/Au, V/Ag, Fe/Au, Fe/Ag, Au/Ag.

As an example of the ternary alloy, there are Pt/Pd/Rh, Pt/Pd/Ni, Pt/Pd/Co, Pt/Pd/Mo, Pt/Pd/W, Pt/Pd/Ce, Pt/Pd/Cu, Pt/Pd/V, Pt/Pd/Fe, Pt/Pd/Au, Pt/Pd/Ag, Pt/Rh/Ni, Pt/Rh/Co, Pt/Rh/Mo, Pt/Rh/W, Pt/Rh/Ce, Pt/Rh/Cu, Pt/Rh/V, Pt/Rh/Fe, Pt/Rh/Au, Pt/Rh/Ag, Pt/Ni/Co, Pt/Ni/Mo, Pt/Ni/W, Pt/Ni/Ce, Pt/Ni/Cu, Pt/Ni/V, Pt/Ni/Fe, Pt/Ni/Au, Pt/Ni/Ag, Pt/Co/Mo, Pt/Co, W, Pt/Co/Ce, Pt/Co/Cu, Pt/Co/V, Pt/Co/Fe, Pt/Co/Au, Pt/Co/Ag, Pt/Mo/W, Pt/Mo/Ce/Pt/Mo/Ce, Pt/Mo/Cu, Pt/Mo/V, Pt/Mo/Fe, Pt/Mo/Au, Pt/Mo/Ag, Pt/W/Ce, Pt/W/Cu, Pt/W/V, Pt/W/Fe, Pt/W/Au, Pt/W/Ag, Pt/Ce/Cu, Pt/Ce/V, Pt/Ce/Fe, Pt/Ce/Au, Pt/Ce/Ag, Pt/Cu/V, Pt/Cu/Fe, Pt/Cu/Au, Pt/Cu/Ag, Pt/V/Fe, Pt/V/Au, Pt/V/Ag, Pt/Fe/Au, Pt/Fe/Ag, Pt/Au/Ag.

In order to carry these catalysts on the alumina film 17, there are considered various methods. As a method suitable for this embodiment, an impregnation method, an evaporation drying method, an equilibrium adsorption method, incipient wetness method or a spraying method is advantageously applicable. Among them, the incipient wetness method is advantageous. This method is a method wherein an aqueous solution containing a given amount of the catalyst is added dropwise to the filter unit F1 and the impregnation of the catalyst into pores of the filter unit F1 is stopped at a time of uniformly and slightly wetting the surface of the carrier (incipient state) and thereafter the drying and firing are conducted. That is, the dropwise addition of the catalyst-containing solution on the surface of the filter unit F1 is carried out by using a bullet or an injection syringe. The carrying amount of catalyst can be controlled by adjusting the concentration of the solution.

Then, the method of carrying the catalyst on the filter unit F1 is explained, but it is not limited to the following method.

A feature of the method of carrying the catalyst on the filter unit F1 in this embodiment lies in that the alumina film 17 containing the rare earth oxide is formed on the irregular surface of the filter unit F1 by a sol-gel process. Particularly, the alumina film 17 containing the rare earth oxide is coated onto each surface of SiC particles forming the cell wall 13 through the impregnation of the solution. Then, the alumina film 17 is changed into an alumina film (carrier film) 17 showing a hair implant structure that ceria-dispersed alumina stands up in form of small fibers at a microscopic section through a step of treated with hot water after the calcining, and then a given amount of the catalyst is adsorbed and fixed onto the surface of the alumina film 17.

Each step of (1) formation of alumina film 17 and (2) carrying of catalyst will be described below.

(1) Coating of Alumina Film 17 onto Filter Unit F1 a. Preliminary Treating Step

In this step, oxidation is carried out by heating at 800-1600° C. for 5-100 hours in order to feed a required amount of Si promoting a chemical bonding with alumina on each surface of SiC particles 16. If sufficient oxide film is existent on the surface of SiC particles 16, this step may be naturally omitted. For example, SiC sintered body itself contains about 0.8 mass % of $SiO_2$. When $SiO_2$ is increased for further improving the heat resistance, it is desirable to heat at 800-1600° C. in an oxidizing atmosphere for 5-100 hours. When the temperature is lower than 800° C., the oxidation reaction hardly occurs, while when it exceeds 1600° C., the oxidation reaction extremely proceeds and the lowering of the strength in the filter is caused. A recommendable condition is 1000-1500° C. and 5-20 hours. In this condition, $SiO_2$ enough to feed Si can be formed on the surface, and also the porosity and pore size in the filter unit F1 are not changed and the pressure loss property is not damaged.

b. Solution Impregnation Step

In this step, a treatment coating the rare earth oxide containing alumina film 17 is carried out by impregnating each surface of the SiC particles 16 constituting the cell wall 13 with a solution of a metal compound containing aluminum and rare earth element, e.g. a mixed aqueous solution of aluminum nitrate and cerium nitrate or the like through a sol-gel process.

As to aluminum-containing compound solution in the above mixed aqueous solution, as a starting metal compound are used a metal inorganic compound and a metal organic compound. As the metal inorganic compound are used $Al(NO_3)_3$, $AlCl_3$, $AlOCl$, $AlPO_4$, $Al_2(SO_4)_3$, $Al_2O_3$, $Al(OH)_3$, Al and the like. Among them, $Al(NO_3)_3$ and $AlCl_3$ are preferable because they are easily soluble in alcohol, water or the like and are easy in the handling. As the metal organic compound are mentioned a metal alkoxide, a metal acetylacetonate and a metal carboxylate. As a concrete example, there are $Al(OCH_3)_3$, $Al(OC_2H_3)_3$, $Al(iso-OC_3H_7)_3$ and the like.

On the other hand, as the cerium-containing solution in the above mixed aqueous solution are used $Ce(NO_3)_3$, $CeCl_3$, $Ce_2(SO_4)_3$, $CeO_2$, $Ce(OH)_3$, $Ce_2(CO_3)_3$ and the like.

As a solvent in the above mixed solution is used at least one selected from water, alcohol, diol, polyvalent alcohol, ethylene glycol, ethylene oxide, triethanolamine, xylene and the like.

In the preparation of the solution, hydrochloric acid, sulfuric acid, nitric acid, acetic acid or fluoric acid may be added as a catalyst. Further, in order to improve the heat resistance of the alumina film 17, at least one element selected from Ce, Li, K, Ca, Sr, Ba, La, Pr, Nd, Si and Zr or a compound thereof other than oxide (nitrate, chloride, sulfate, hydroxide or carbonate) may be added to the starting material in addition to the rare earth oxide.

As an example of a preferable metal compound in this embodiment, mention may be made of $Al(NO_3)_3$ and $Ce(NO_3)_3$. They are dissolved in the solvent at a relatively low temperature and is easy in the preparation of the starting solution. Also, 1,3-butane diol is recommended as a preferable solvent. A first reason of the recommendation lies in that the viscosity is adequate and a gel film having a proper thickness may be formed on the SiC particles 16 at a gel state. A second reason is due to the fcat that this solvent forms a metal alkoxide in the solution and a metal oxide polymer having oxygen-metal-oxygen bond or a precursor of metal oxide gel may be easily formed.

The amount of $Al(NO_3)_3$ is desirable to be 10-50 mass %. When it is less than 10 mass %, the alumina amount having a surface area for maintaining the activity of the catalyst for a long time can not be carried, while when it exceeds 50 mass %, an amount of heat generation becomes large in the dissolution and the gelation is easily caused.

Also, the amount of $Ce(NO_3)_3$ is preferable to be 1-30 mass %. When it is less than 1 mass %, the oxidation of the soot can not be promoted, while when it exceeds 30 mass %, the grain growth of $CeO_2$ occurs after the firing.

The mixing ratio of $Al(NO_3)_3$ to $Ce(NO_3)_3$ is preferable to be 10:2. As $Al(NO_3)_3$ becomes richer, the dispersibility of $CeO_2$ particles after the firing can be improved.

In the preparation of the impregnating solution of the above metal compound, the temperature is desirable to be 50-130°

C. When the temperature is lower than 50° C., the solubility of the solute is low, while when it exceeds 130° C., the reaction is violently promoted to cause gelation and the use of the applying solution is impossible.

The stirring time is desirable to be 1-9 hours. When it is within the above range, the viscosity of the solution is stable.

As to the above cerium-containing metal compound (Al$(NO_3)_3$ and $Ce(NO_3)_3$), $ZrO(NO_3)_2$ or $ZrO_2$ is used as a zirconium source for producing a composite oxide with zirconium or a solid solution in addition to the above example. In this case, it is preferable that the above substance is dissolved in water or ethylene glycol to form a mixed solution and dried and fired to form the above composite oxide.

In the above embodiment, it is important that the solution of the above metal compound is sufficiently penetrated into all pores between SiC particles 16 in the cell wall 13. For this end, it is preferable to adopt a method wherein the filter unit F1 is placed in a vessel and the solution of the metal compound is filled therein to conduct deaeration, a method wherein the solution is flown into one side of the filter unit F1 and deaeration is carried out at the other side, and the like. As the deaeration apparatus may be used a vacuum pump or the like in addition to an aspirator. By using such an apparatus can be removed air from the pores in the cell wall 13 and hence the solution of the metal compound can be well fed onto the each surface of SiC particles 16.

c. Drying Step

This step is a treatment that volatile components such as $NO_2$ and the like are removed by evaporation and the solution is gelated and fixed to the surfaces of SiC particles 16 and at the same time extra solution is removed, which is carried out by heating at 120-170° C. for about 2 hours. When the heating temperature is lower than 120° C., the volatile components hardly evaporate, while when it exceeds 170° C., the gelated film thickness become non-uniform.

d. Preliminary Firing Step

This step is a calcining treatment for removing residual components to form an amorphous alumina film 17. Concretely, it is desirable to heat at a temperature of 300-500° C. When the calcining temperature is lower than 300° C., the residual organic mass is hardly removed, while when it exceeds 500° C., $Al_2O_3$ is crystallized and hence boehmite of small fibrous protrusion can not be formed.

e. Hot Water Treating Step

This step is a treatment that the calcined filter unit F1 is immersed in hot water for forming the alumina film 17 having a specified structure inherent to the above embodiment. In this hot water treatment, the particles on the surface of the amorphous alumina film 17 is immediately discharged into the solution at a sol state by a deflocculation action and also boehmite particles produced by hydration are aggregated in form of small fibrous protrusions and form a stable state against deflocculation.

That is, the rare earth oxide-containing alumina adhered to each surface of the SiC particles 16 is stood up in form of small fibers (protrusions) by the hot water treatment, which forms a rough surface indicating the hair implant structure. Therefore, there is formed the alumina film 17 having a high specific surface area. In general, the sintering of alumina mainly proceeds through surface diffusion, and when it is changed into α-alumina phase, the specific surface area rapidly reduces. However, since silica is enclosed in the alumina particles, it is considered that hole sites of alumina are clogged with silica in the course of the heat treatment or silica moves toward surfaces of needle-like particles to control the surface diffusion or the sintering of the particles. Therefore, it is considered that the viscous flowing mechanism through the sintering from the contact point between the needle-like particles is predominant in the initial sintering stage of the filter unit F1, but silica shuts off the mass transfer path between the needle-like particles at the last stage and hence the transfer into α-alumina is obstructed and the sintering is not proceeded to maintain the high specific surface area.

In the hot water treatment, the temperature is desirable to be 50-100° C. When it is lower than 50° C., the hydration of the amorphous alumina film 17 does not proceed and the boehmite of small fibrous protrusion is not formed. While, when it exceeds 100° C., water is evaporated and this step is hardly maintained over a long time. The treating time is desirable to be not less than 1 hour. When it is less than 1 hour, the hydration of the amorphous alumina is insufficient.

f. Firing Step

In this step is conducted a treatment for dehydrating boehmite produced through hydration to form alumina crystal. The firing temperature is preferable to be 500-1000° C. When the temperature is lower than 500° C., the crystallization does not proceed, while when it exceeds 1000° C., the sintering proceeds much and there is a tendency of lowering the surface area.

(2) Carrying of Catalyst a. Solution Preparing Step

Onto the surface of the filter unit F1 is coated the rare earth oxide-containing alumina film (carrying film) 17 having the hair implant structure as shown in FIG. 8(*b*) and a catalyst such as Pt or the like is carried on the irregular surface of the alumina film 17. In this case, the carrying amount of the catalyst is determined by adding dropwise and impregnating the aqueous solution containing Pt or the like by a water absorbing amount of the filter unit Fl so as to slightly wet the surface thereof.

For example, the water absorbing amount held by the filter unit F1 means that when the measured value of the water absorbing amount of a dry carrier is 22.46 mass %, if the carrier has a mass of 110 g and a volume of 0.163 l, the carrier absorbs 24.79/l of water. As a starting material of Pt is used, for example, a solution of dinitrodiamine platinum nitrate ($[Pt(NH_3)_2(NO_2)_2]HNO_3$, Pt concentration: 4.53 mass %). In order to carry a given amount (1.7 g/l) of Pt, it is sufficient to carry Pt of 1.7 (g/l)*0.163 (1)=0.272 g on the carrier, so that the solution of dinitrodiamine platinum nitrate (Pt concentration: 4.53%) is diluted with a distilled water. That is, a weight ratio X (%) of solution of dinitrodiamine platinum nitrate (Pt concentration: 4.53 mass %)/distilled water is 24.8 mass % as calculated by X=0.272 (Pt amount, g)/24.7 (water content, g)/4.53 (Pt concentration, mass %).

b. Solution Impregnating Step

The aqueous solution of dinitrodiamine platinum nitrate adjusted to a given amount as mentioned above is added dropwise to both end faces of the filter unit F1 at constant intervals through a pipette. For example, 40-80 droplets are added every one-side face at constant intervals, whereby Pt is uniformly dispersed and fixed onto the surface of the alumina thin film 3 covering the filter unit F1.

c. Drying, Firing Step

After the addition of the aqueous solution, the ceramic carrier is dried at 110° C. for about 2 hours to remove water content and transferred into a desiccator and left to stand therein for 1 hour and thereafter the adhered amount is measured by an electron weighing machine or the like. Then, the firing is carried out in $N_2$ atmosphere at about 500° C. for about 1 hour to metallize Pt. The filter unit F1 is used as a diesel particulate filter (hereinafter abbreviated as DPF simply). This unit itself has only a function of catching particulates (floating particular substance: PM) with the cell wall 13, but when the catalyst is carried thereon, hydrocarbon and carbon monooxide in the exhaust gas can be oxdized.

Also, it is possible to conduct reduction of NOx even in an oxidizing atmosphere as in the diesel exhaust gas when being carried with NOx selective reduction type catalyst component or occlusion type catalyst component capable of reducing NOx. Moreover, the particulates caught in DPF bring about the increase of pressure loss of DPF with the deposition, so that it is usually necessary to remove them by burning treatment or the like to regenerate DPF. The temperature starting the burning of soot (carbon), which is a main component of the particulates included in the diesel exhaust gas, is about 550-630° C. In this connection, when the catalyst is carried on DPF, the burning reaction path of the soot is changed and energy barrier can be made low. Thus, the burning temperature is largely lowered to 300-400° C. and hence energy required for regeneration can be reduced to constitute DPF system having a high regeneration efficiency together with the action of ceria as mentioned above.

As mentioned above, it can be said that the filter unit F1 according to the embodiment of the invention is preferable to apply to a system for particularly treating a diesel exhaust gas, whereby the following functions can be expected:

a. Function as an Oxidation Catalyst for Diesel Exhaust Gas (1) Exhaust gas purifying function . . . oxidation of THC (total hydrocarbon), CO (2) Function not obstructing operation of engine . . . pressure loss b. Function as a Diesel Particulate Filter Provided with a Catalyst (1) Exhaust gas purifying function . . . burning temperature of soot, oxidation of THC, CO (2) Function not obstructing operation of engine . . . pressure Loss

EXAMPLES

Reference Example (1) 51.5% by weight of α-type silicon carbide powder and 22% by weight of β-type silicon carbide powder are mixed at a wet state and added and mixed with 6.5% by weight of an organic binder (methylcellulose) and 20% by weight of water. Then, the mixture is added and mixed with small amounts of a plasticizer and a lubricant and extruded to obtain a honeycomb green shaped body.

(2) Then, the green shaped body is dried by using a microwave drying machine. Thereafter, a part of through-holes 12 in the shaped body are sealed with a plug paste made of a porous silicon carbide sintered body. Then, the plug paste is dried by again using the drying machine.

Subsequent to the end face sealing step, the dried shaped body is degreased at 400° C. and thereafter fired at 2200° C. in an argon atmosphere under an atmospheric pressure for about 3 hours. As a result, there is obtained a filter unit F1 made of a porous silicon carbide sintered body.

(3) A paste used for the formation of a sealing material layer 15 is prepared by mixing 23.3% by weight of ceramic fibers (alumina silicate ceramic fibers, shot content: 3%, fiber length: 0.1 mm-100 mm), 30.2% by weight of silicon carbide powder having an average particle size of 0.3 μm, 7% by weight of silica sol as an inorganic binder (amount of the sol converted into $SiO_2$ is 30%), 0.5% by weight of carboxymethyl cellulose as an organic binder and 39% by weight of water and adjusting a viscosity of the mixture.

(4) The, the paste for the formation of the adhesive layer is uniformly applied onto each outer peripheral face of the filter units F1, while the outer peripheral faces of the filter units F1 are closed to each other and dried and cured under conditions of 50° C.-100° C.×1 hour, whereby the filter units F1 are adhered to each other through the sealing material layer 15. In this case, the thickness of the sealing material layer 15 is set to 1.0 mm.

(5) The filter units F1 are combined in 16 units in total of 4 units×4 units to finish a ceramic filter 9 of a square at section.

The thus obtained ceramic filter 9 is wound with a heat insulating material 10, and then the ceramic filter 9 is placed in a casing 8 at this state, and a first exhaust pipe 6, the casing 8 and a second exhaust pipe 7 are arranged in this order. Using casings 8a-8d having four kinds of pipe arrangements as shown in FIG. 5 is fed an exhaust gas from a diesel engine for a constant time. After the catching for 10 hours, the ceramic filter 9 is taken out and cut to observe visually.

As a result, soot 16 is stored in the each kind of the casings 8a, 8b, 8c and 8d as shown in FIG. 5. In case of the casing 8a, the first exhaust pipe 6 and the second exhaust pipe 7 are arranged in a central portion of the casing 8 at section, so that a greater part of the soot 16 is stored in the central portion of the ceramic filter 9. In case of the casing 8b, the first exhaust pipe 6 and the second exhaust pipe 7 are arranged on either one side of the peripheral edge portion of the casing 8, so that a greater part of the soot 16 is stored on an elongated line of the exhaust pipe toward the peripheral edge portion of the ceramic filter 9 at section. In case of the casing 8c, the first exhaust pipe 6 is arranged in the central portion of the casing 8 at section, while the second exhaust pipe 7 is arranged in the peripheral edge portion of the casing 8 at section, so that a greater part of the soot is stored in the central portion of the ceramic filter 9 and the peripheral edge portion arranging the second exhaust pipe. In case of the casing 8d, the first exhaust pipe 6 is positioned in an upper peripheral portion of the casing 8, while the second exhaust pipe 7 is positioned in a lower peripheral portion of the casing 8 and is not opposed to the first exhaust pipe 6, so that a greater part of the soot 16 is stored in portions of the ceramic filter 9 corresponding to the arranged positions of the first exhaust pipe 6 and the second exhaust pipe 7.

In the ceramic filter 9 is observed a tendency that the soot is largely stored in the filter units F1 near to the downstream side end of the first exhaust pipe 6 and the upstream side end of the second exhaust pipe 7.

It can be considered that the storing amount of the soot 16 is proportional to a flowing amount of a gas. For example, the filter unit F1 positioned near to the downstream side end of the first exhaust pipe is faster in the incoming gas rate as compared with the filter unit F1 located far away therefrom (the amount is larger), and also if the upstream side end of the second exhaust pipe is located opposite to the same filter, the gas rate in the filter at this position more increases (the amount becomes larger).

In the example mentioned later, therefore, the first exhaust pipe and the second exhaust pipe are connected to the central portion of the casing as shown in FIG. 5(*a*). In the ceramic filter 9, therefore, there can be another region producing the difference of the flow rate between the central portion of 4 units and the peripheral portion of 12 units. Next, comparative tests are carried out by applying various kinds of filters to the two regions.

Example 1

In Example 1-1, the ceramic filter 9 is basically prepared in the same manner as the reference example. In Example 1-1, however, a ceramic filter 9 of 16 filters in total is prepared by using two kinds of SiC filter and cordierite filter as shown in Table 1 and arranging 12 commercially available cordierite filters in the peripheral portion and 4 SiC filters in the central portion. In this case, the thermal conductivity of cordierite is 2 W/mk, and the thermal conductivity of SiC is 70 W/mk.

Then, the thus obtained ceramic filter 9 is wound with a heat insulating material 10 and received in a casing 8 at this state, and then the exhaust gas of the engine is fed for a constant time as shown in the reference example. After the catching for 10 hours, the ceramic filter 9 is taken out and cut to conduct visual observation. As a result, the storing amount at the peripheral portion becomes smaller than that at the central portion as shown in FIG. 6(*a*).

Next, a new ceramic filter 9 is provided and the exhaust gas is fed thereto. After the catching and regeneration are repeated 100 times, the ceramic filter 9 is taken out to conduct the visual observation. As a result, no crack is observed in the filter units F1. Also, the average regeneration ratio of the ceramic filter 9 is as high as 95%, and no soot 16 is existent as visually observed after the cutting.

Comparative Examples 1-1,1-2

Even in Comparative Examples 1-1,1-2, the ceramic filter 9 is basically prepared in the same manner as in the reference example. However, in Comparative Example 1-1, a ceramic filter 9 is prepared by using 16 SiC filter units as shown in Table 1. In Comparative Example 1-2, a ceramic filter 9 of 16 filters in total is prepared by using two kinds of SiC filter and cordierite filter and arranging 4 cordierite filters in the central portion and 12 SiC filters in the outer peripheral portion.

Then, the thus obtained ceramic filter 9 is wound with a heat insulating material 10 and received in a casing 8 at this state, and the exhaust gas of the engine is fed for a constant time as shown in the reference example. After the catching for 10 hours, the ceramic filter 9 is taken out and cut to conduct visual observation. As a result, in Comparative Examples 1-1 and 1-2, the storing amount in the peripheral portion is made small likewise Example 1-1 as shown in FIG. 6(*a*).

Then, a new ceramic filter 9 is used and the exhaust gas is fed, and after the catching and regeneration are repeated 100 times, the filter is taken out to conduct visual observation. As a result, no crack of the filter unit F1 is observed in Comparative Example 1-1. However, the average regeneration ratio of the ceramic filter is as low as 85%, and as a result of visual observation on the cut face, a small amount of soot is retained in the filter units F1 located at the outer peripheral portion after the burning. In Comparative Example 1-2, cracks are observed in the filter units F1 located at the central portion. Also, the average regeneration ratio is as low as 80%, and as a result of visual observation on the cut face, a greater amount of soot is retained in the filter units F1 located at the outer peripheral portion after the burning as compared with Comparative Example 1-1.

TABLE 1

|  | Example 1-1 | | Comparative Example 1-1 | | Comparative Example 1-2 | |
| --- | --- | --- | --- | --- | --- | --- |
|  | Central portion | Peripheral portion | Central portion | Peripheral portion | Central portion | Peripheral portion |
| Filter unit | SiC | Cordierite | SiC | SiC | Cordierite | SiC |
| Cell Structure (mill/cell number) | 14/200 | 14/200 | 14/200 | 14/200 | 14/200 | 14/200 |
| Porosity of filter | 42% | 42% | 42% | 42% | 42% | 42% |
| Pore size of filter | 10 μm | 10 μm | 10 μm | 10 μm | 10 μm | 10 μm |
| Pressure loss (PM 0 g/L, 13 m/s) | 10 | 8 | 10 | 10 | 8 | 10 |

TABLE 1-continued

|  | Example 1-1 | | Comparative Example 1-1 | | Comparative Example 1-2 | |
| --- | --- | --- | --- | --- | --- | --- |
|  | Central portion | Peripheral portion | Central portion | Peripheral portion | Central portion | Peripheral portion |
| Average bending load | 350 kgf/cm$^2$ | 25 kgf/cm$^2$ | 350 kgf/cm$^2$ | 350 kgf/cm$^2$ | 25 kgf/cm$^2$ | 350 kgf/cm$^2$ |
| Regeneration ratio | 95% | | 85% | | 80% | |

Example 2

In this example, experiments are carried out as a typical example of ceramic filters 9 having different pressure losses. The ceramic filter 9 is basically prepared in the same manner as in the reference example. In this case, the filters are prepared by changing molds to adjust a thickness of cell wall 13 in the SiC filter unit or cell number as shown in Table 2 and by changing a compounding ratio of starting materials to adjust a porosity and a pore size as shown in Table 3.

With respect to the filter units F1, a standard pressure loss is measured (pressure difference is measured when air of PM 0 g/L is flown at a flow rate of 13 m/s), and the results are also shown in Tables 2 and 3.

Then, the ceramic filter 9 is prepared by setting 12 filters to the peripheral portion and setting 4 filters to the central portion as shown in Table 4.

Next, the thus obtained ceramic filter 9 is wound with a heat insulating material 10 and received in a casing 8, and an exhaust gas of an engine is fed for a given time as shown in the reference example. After the catching for 10 hours, the filter is taken out and cut to conduct visual observation. The results are also shown in Table 4.

Thereafter, a new ceramic filter 9 is again provided and the exhaust gas is actually fed. After the catching and regeneration of 100 times, the ceramic filter 9 is taken out to conduct visual observation. The results and regeneration ratio are shown in Table 4.

TABLE 2

|  | A | Substrate B | Substrate C | Substrate D | Substrate E | Substrate F | Substrate G | Substrate H |
| --- | --- | --- | --- | --- | --- | --- | --- | --- |
| ① | SiC | SiC | SiC | SiC | SiC | SiC | SiC | SiC |
| ② | 12/200 | 14/200 | 16/200 | 16/200 | 12/70 | 12/200 | 12/300 | 12/400 |
| ③ | 42% | 42% | 42% | 42% | 42% | 42% | 42% | 42% |
| ④ | 10 | 10 | 10 | 10 | 10 | 10 | 10 | 10 |
| ⑤ | 9 | 10 | 13 | 14 | 8.9 | 8.9 | 9.1 | 9.1 |
| ⑥ | 11 | 12 | 15.6 | 16.8 | 15 | 13 | 10.3 | 9.5 |

① Filter unit
② Cell structure (mill/cell)
③ Porosity of filter (%)
④ Average pore size of filter (μm)
⑤ Pressure loss P1 (PM 0 g/L, 13 m/s)
⑥ Pressure loss P2 (PM 5 g/L, 13 m/s)

TABLE 3

|  | Substrate A | Substrate I | Substrate J | Substrate K | Substrate L |
| --- | --- | --- | --- | --- | --- |
| Filter unit | SiC | SiC | SiC | SiC | SiC |
| Cell structure (mill/cell number) | 12/200 | 12/200 | 12/200 | 12/200 | 12/200 |
| Average particle size of SiC(70 parts by weight) | 10 μm | 10 μm | 10 μm | 30 μm | 50 μm |
| Average particle size of SiC(30 parts by weight) | 0.5 μm | 0.5 μm | 0.5 μm | 0.5 μm | 0.5 μm |
| Shaping assistance (methyl cellulose) | 10 parts by weight | 6 parts by weight | 15 parts by weight | 10 parts by weight | 10 parts by weight |
| Amount of organic pore forming material (acryl) | 0 parts by weight | 0 parts by weight | 5 parts by weight | 0 parts by weight | 0 parts by weight |
| Average pore size of organic pore forming material (acryl) |  |  | 10 μm | 30 μm | 50 μm |
| Porosity of filter unit(%) | 42% | 30% | 50% | 42% | 42% |
| Average pore size of filter unit (μm) | 10 | 10 | 10 | 30 | 50 |
| Pressure loss P1(PM 0 g/L 13 m/s) | 9 | 12 | 8.5 | 8.6 | 8.3 |

TABLE 4

| | Central Portion | Peripheral portion | Pressure loss ratio (filer at peripheral portion/filter at central portion) soot 0 g/L | Pressure loss ratio (filer at peripheral portion/filter at central portion) soot 5 g/L | Deposited state of soot after the catching for 10 hours | Catching and Regeneration of 100 times Average regeneration ratio | Catching and Regeneration of 100 times Crack |
|---|---|---|---|---|---|---|---|
| Example 2-1 | Substrate A | Substrate B | 1.1 | | FIG. 6(b) | 88% | absence |
| Example 2-2 | Substrate A | Substrate C | 1.4 | | FIG. 6(b) | 90% | absence |
| Example 2-3 | Substrate A | Substrate D | 1.6 | | FIG. 6(d) | 82% | presence |
| Comparative Example 2-1 | Substrate A | Substrate A | 1.0 | | FIG. 6(a) | 85% | presence |
| Example 2-4 | Substrate H | Substrate G | | 1.1 | FIG. 6(b) | 88% | absence |
| Example 2-5 | Substrate H | Substrate A | | 1.2 | FIG. 6(b) | 92% | absence |
| Example 2-6 | Substrate H | Substrate F | | 1.4 | FIG. 6(b) | 88% | absence |
| Example 2-7 | Substrate H | Substrate E | | 1.6 | FIG. 6(d) | 82% | presence |
| Comparative Example 2-2 | Substrate H | Substrate H | | 1.0 | FIG. 6(a) | 86% | presence |
| Example 2-8 | Substrate A | Substrate I | 1.3 | | FIG. 6(b) | 90% | absence |
| Comparative Example 2-3 | Substrate A | Substrate J | 0.9 | | FIG. 6(a) | 82% | presence |
| Example 2-9 | Substrate K | Substrate L | 1.04 | | FIG. 6(b) | 86% | absence |
| Example 2-10 | Substrate A | Substrate L | 1.1 | | FIG. 6(b) | 89% | absence |

Example 3

Even in Example 3-1, the ceramic filter 9 is basically prepared in the same manner as in the reference example. Two kinds of SiC filters having different strengths are used in Example 3-1 as shown in Table 5. In order to change the strength, a higher firing temperature is set to 2300° C.-3 hr, and a lower firing temperature is set to 2100° C.-2 hr. The strength is measured by a three-point bending test described in JIS R1625. In this case, a lower spun is set to 135 mm, and a head speed is set to 0.5 mm/sec. This test is carried out 20 times, and the ceramic filter 9 is prepared by selecting filters from the same production lot. In this case, the ceramic filter 9 is prepared by setting 12 SiC filters having an average bending load of 250 kg/cm$^2$ to the peripheral portion and 4 SiC filters having an average bending load of 350 kg/cm$^2$ to the central portion.

Then, the thus obtained ceramic filter 9 is wound with a heat insulating material 10 and received in a casing 8, and an exhaust gas of an engine is fed for a given time as shown in the reference example. After the catching for 10 hours, the filter is taken out and cut to conduct visual observation. As a result, the storing amount in the peripheral portion of the filter becomes smaller than that in the central portion as shown in FIG. 6(a).

Thereafter, a new ceramic filter 9 is again provided and the exhaust gas is actually fed. After the catching and regeneration of 100 times, the ceramic filter 9 is taken out to conduct visual observation. As a result, no crack is observed in the filter units F1. Also, the average regeneration ratio is as high as 90%, and the soot is not existent as a result of visual observation on the cut face.

Comparative Examples 3-1, 3-2

Even in Comparative Examples 3-1, 3-2, the ceramic filter 9 is basically prepared in the same manner as in the reference example. In Comparative Example 3-1, the ceramic filter 9 is prepared by using 16 SiC filters having a standard average bending load of 250 kg/cm$^2$ as shown in Table 5. In Comparative Example 3-2, the ceramic filter 9 is prepared by using 4 SiC filter having an average bending load of 250 kg/cm$^2$ in the central portion and 12 SiC filters having a standard average bending load of 350 kg/cm$^2$ in the peripheral portion.

Then, the thus obtained ceramic filter 9 is wound with a heat insulating material 10 and received in a casing 8, and an exhaust gas of an engine is fed for a given time as shown in the reference example. After the catching for 10 hours, the filter is taken out and cut to conduct visual observation. As a result, even in Comparative Examples 3-1, 3-2, the storing amount in the peripheral portion becomes smaller than that in the central portion as shown in FIG. 6(a).

Thereafter, a new ceramic filter 9 is again provided and the exhaust gas is actually fed. After the catching and regeneration of 100 times, the ceramic filter 9 is taken out to conduct visual observation. As a result, cracks are observed in the filter units F1 located at the central portion in Comparative Examples 3-1, 3-2.

TABLE 5

| | Example 3-1 | | Comparative Example 3-1 | | Comparative Example 3-2 | |
|---|---|---|---|---|---|---|
| | Central portion | Peripheral portion | Central Portion | Peripheral portion | Central Portion | Peripheral portion |
| Filter unit | SiC | SiC | SiC | SiC | SiC | SiC |
| Cell structure | 14/200 | 14/200 | 14/200 | 14/200 | 14/300 | 14/200 |

TABLE 5-continued

|  | Example 3-1 | | Comparative Example 3-1 | | Comparative Example 3-2 | |
| --- | --- | --- | --- | --- | --- | --- |
|  | Central portion | Peripheral portion | Central Portion | Peripheral portion | Central Portion | Peripheral portion |
| (mill/cell number) |  |  |  |  |  |  |
| Porosity of filter | 42% | 42% | 42% | 42% | 42% | 42% |
| Pore size of filter | 10 μm | 10 μm | 10 μm | 10 μm | 10 μm | 10 μm |
| Pressure loss (PM 0 g/L, 13 m/s) | 10 | 10 | 10 | 10 | 10 | 10 |
| Average bending load | 350 kgf/cm$^2$ | 250 kgf/cm$^2$ | 250 kgf/cm$^2$ | 250 kgf/cm$^2$ | 250 kgf/cm$^2$ | 350 kgf/cm$^2$ |
| Regeneration ratio | 90% | | 85% | | 88% | |

Example 4

Then, the catching and regeneration are repeated by utilizing an engine having a slow gas flow rate in the regeneration.

Example 4-1 is an example that a ceramic filter 9 is basically prepared in the same manner as in Example 3. In Example 4-1, however, the ceramic filter 9 is prepared by using two kinds of SiC filters having different strengths as shown in Table 6.

Then, the thus obtained ceramic filter 9 is wound with a heat insulating material 10 and received in a casing 8, and an exhaust gas of an engine is fed for a given time as shown in the reference example. After the catching for 10 hours, the ceramic filter 9 is taken out and cut to conduct visual observation. As a result, the storing amount in the peripheral portion becomes smaller than that in the central portion as shown in FIG. 6(*a*).

Thereafter, a new ceramic filter 9 is again provided and the exhaust gas is actually fed. After the catching and regeneration of 100 times, it is taken out to conduct visual observation. In this case, the regeneration is conducted under a condition of a slow flow rate as compared with the condition of Example 3. As a result, no crack is observed in the filter units F1. Also, the average regeneration ratio is as low as 80%. As a result of visual observation on the cut face, soot is existent.

Comparative Examples 4-1, 4-2

Even in Comparative Examples 4-1, 4-2, the ceramic filter 9 is basically prepared in the same manner as in the reference example. In Comparative Example 4-1, the ceramic filter 9 is prepared by using 16 SiC filters having a standard average bending load of 250 kg/cm$^2$ as shown in Table 6. In Comparative Example 4-2, the ceramic filter 9 is prepared by using 4 SiC filters having an average bending load of 250 kg/cm$^2$ in the central portion and 12 SiC filters having a standard average bending load of 350 kg/cm$^2$ in the peripheral portion.

Then, the thus obtained ceramic filter 9 is wound with a heat insulating material 10 and received in a casing 8, and an exhaust gas of an engine is fed for a given time as shown in the reference example. After the catching for 10 hours, the filter is taken out and cut to conduct visual observation. As a result, even in Comparative Examples 4-1, 4-2, the storing amount in the peripheral portion becomes smaller than that in the central portion as shown in FIG. 6(*a*).

Thereafter, a new ceramic filter 9 is again provided and the exhaust gas is actually fed. After the catching and regeneration of 100 times, the ceramic filter 9 is taken out to conduct visual observation. As a result, cracks are observed in the filter units F1 located at the peripheral portion in Comparative Examples 4-1, 4-2.

TABLE 6

|  | Example 4-1 | | Comparative Example 4-1 | | Comparative Example 4-2 | |
| --- | --- | --- | --- | --- | --- | --- |
|  | Central portion | Peripheral portion | Central portion | Peripheral portion | Central portion | Peripheral portion |
| Filter unit | SiC | SiC | SiC | SiC | SiC | SiC |
| Cell structure (mill/cell number) | 14/300 | 14/200 | 14/200 | 14/200 | 14/200 | 14/200 |
| Porosity of filter | 42% | 42% | 42% | 42% | 42% | 42% |
| Pore size of filter | 10 μm | 10 μm | 10 μm | 10 μm | 10 μm | 10 μm |
| Pressure loss (PM 0 g/L, 13 m/s) | 10 | 10 | 10 | 10 | 10 | 10 |
| Average bending load | 250 kgf/cm$^2$ | 350 kgf/cm$^2$ | 250 kgf/cm$^2$ | 250 kgf/cm$^2$ | 350 kgf/cm$^2$ | 250 kgf/cm$^2$ |
| Regeneration ratio | 85% | | 85% | | 88% | |

Example 5

Even in Example 5-1, the ceramic filter 9 is basically prepared in the same manner as in the reference example. In Example 5-1, however, there are used two kinds of SiC filter units F1 having different lengths as shown in Table 7. In this case, the ceramic filter 9 is prepared by using 4 SiC filters having a standard length of 150 mm in the central portion and 12 SiC filters of 130 mm in the peripheral portion.

Figure 7A:
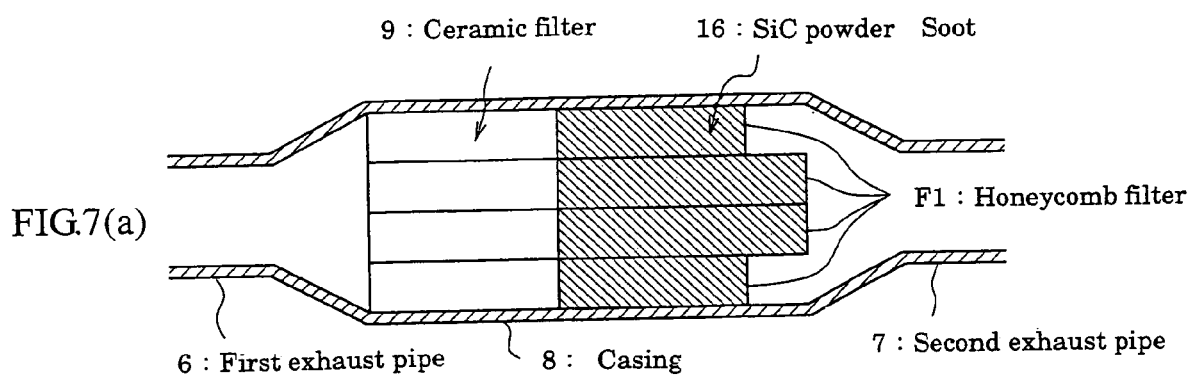
FIGS. 7(a) and 7(b) are graphs showing results of Comparative Example indicating a difference of soot storing amount by changing a length of a filter.
Figure 7B:
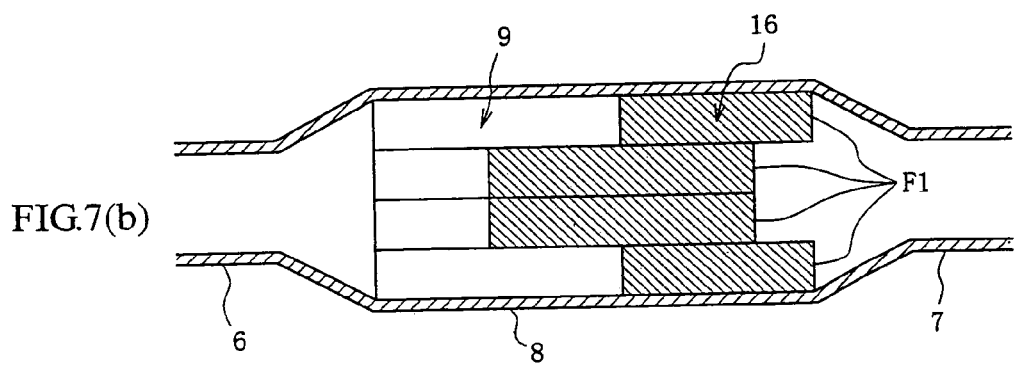

Then, the thus obtained ceramic filter 9 is wound with a heat insulating material 10 and received in a casing 8, and an exhaust gas of an engine is fed for a given time as shown in the reference example. After the catching for 10 hours, the filter is taken out and cut to conduct visual observation. As a result, soot is stored at substantially the same positions in the central portion and the peripheral portion of the filters as shown in FIG. 7(*a*).

Thereafter, a new ceramic filter 9 is again provided and the exhaust gas is actually fed. After the catching and regeneration of 100 times, the ceramic filter 9 is taken out to conduct visual observation. As a result, no crack is observed in the filter units F1. Also, the average regeneration ratio is as high as 90%. As a result of visual observation on the cut face, soot is not existent.

Comparative Examples 5-1, 5-2

Even in Comparative Examples 5-1, 5-2, the ceramic filter 9 is basically prepared in the same manner as in the reference example. In Comparative Example 5-1, however, the ceramic filter 9 is prepared by using 16 SiC ceramic filters having a standard length of 150 mm as shown in Table 7. In Comparative Example 5-2, the ceramic filter 9 is prepared by forming the peripheral portion with 12 SiC filters having a standard length of 150 mm and forming the central portion with 4 SiC filters having a length of 130 mm.

Then, the thus obtained ceramic filter 9 is wound with a heat insulating material 10 and received in a casing 8, and an exhaust gas of an engine is fed for a given time as shown in the reference example. After the catching for 10 hours, the filter is taken out and cut to conduct visual observation. As a result, in Comparative Example 5-1, the storing amount in the peripheral portion becomes smaller than that in the central portion as shown in FIG. 6(*a*). In Comparative Example 5-2, the storing amount in the peripheral portion is smaller than that in the central portion as shown in FIG. 7(*b*), and the difference is large as compared with FIG. 6(*a*).

Thereafter, a new ceramic filter 9 is again provided and the exhaust gas is actually fed. After the catching and regeneration of 100 times, the ceramic filter 9 is taken out to conduct visual observation. As a result, no crack of the filter unit F1 is observed in Comparative Example 5-1. However, the average regeneration ratio is as low as 85%, and some soot retained after the burning is produced in the filter units F1 at the peripheral portion as a result of visual observation on the cut face. Also, in Comparative Example 5-2, crack is observed in the filter units F1 at the peripheral portion. Further, the regeneration ratio is as low as 70% on average, and the amount of soot larger than that of Comparative Example 5-1 after the burning is produced in the filter units F1 at the peripheral portion as a result of visual observation on the cut face.

TABLE 7

| | Example 5-1 | | Comparative Example 5-1 | | Comparative Example 5-2 | |
|---|---|---|---|---|---|---|
| | Central portion | Peripheral portion | Central portion | Peripheral portion | Central portion | Peripheral portion |
| Filter unit | SiC | SiC | SiC | SiC | SiC | SiC |
| Cell structure (mill/cell number) | 14/200 | 14/200 | 14/200 | 14/200 | 14/200 | 14/200 |
| Porosity of filter | 42% | 42% | 42% | 42% | 42% | 42% |
| Pore size of filter | 10 μm | 10 μm | 10 μm | 10 μm | 10 μm | 10 μm |
| Pressure loss (PM 0 g/L, 13 m/s) | 10 | 10 | 10 | 10 | 10 | 10 |
| Average bending load | 350 kgf/cm$^2$ | 350 kgf/cm$^2$ | 350 kgf/cm$^2$ | 350 kgf/cm$^2$ | 350 kgf/cm$^2$ | 350 kgf/cm$^2$ |
| total length | 150 mm | 130 mm | 150 mm | 150 mm | 130 mm | 150 mm |
| regeneration ratio | 90% | | 85% | | 70% | |

As seen from the above, according to the invention, there can be obtained the following effects.

① In the filter of Example 1, the portion easily retaining soot and having a fast flow rate can be rendered into a high temperature by changing the materials of two or more kinds of filter units to produce a difference of thermal conduction. Therefore, the uniform regeneration of the whole of the filter can be promoted.

② In the filter of Example 2, the flow of the exhaust gas is made easy flow toward a filter having a low pressure loss by combining filter units having a high pressure loss with filter units having a low pressure loss. Therefore, the uniform catching and regeneration of the filter can be effectively carried out by arranging the filter having a low pressure loss in a portion having a low exhaust gas flow amount. Also, the uniform catching and regeneration as a whole of the filter can be carried out when the pressure loss of the peripheral portion is 1.0-1.5 of the pressure loss of the central portion.

③ In the filter of Example 2, the uniform catching and regeneration of the filter can be effectively carried out by arranging the filters having a thin wall thickness in the portion having a low exhaust gas flow amount and the filters having a thick wall thickness in the portion having a high exhaust gas flow amount.

④ In the filter of Example 2, the uniform catching and regeneration of the filter can be effectively carried out by arranging the filters having a high porosity in the portion having a low exhaust gas flow amount and the filters having a low porosity in the portion having a high exhaust gas flow amount.

⑤ In the filter of Example 2, the uniform catching and regeneration of the filter can be effectively carried out by arranging the filters having a large pore size in the portion having a low exhaust gas flow amount and the filters having a small pore size in the portion having a high exhaust gas flow amount.

⑥ In the filter of Example 2, the uniform catching and regeneration of the filter can be effectively carried out by arranging the filters having a high cell density in the portion having a low exhaust gas flow amount and the filters having a low cell density in the portion having a high exhaust gas flow amount.

⑦ In the filters of Examples 3 and 4, filters suitable for the catching amount can be set by using filters having different strengths and arranging strong filters in the portion easily subjected to thermal shock, so that the strength as a whole of the filters is increased.

⑧ In the filter of Example 5, the aggregate is constructed by using filters having a long length in the portion having a large fluid flow amount and filters having different length in the portion having a small amount, whereby the catching amount of soot can be made constant from a gas flowing section and the regeneration can be effectively conducted.

When the pressure loss of the peripheral portion is 1.01-1.5 of the pressure loss of the central portion, the catching and regeneration can be conducted more uniformly.

Moreover, the above embodiments of the invention can be modified as follows.

a. Filter formed by arranging filters having a thick wall thickness and a low porosity in the central portion of the filter aggregate and filters having a thin wall thickness and a high porosity in the peripheral portion thereof.

b. Filter formed by arranging filters having different lengths so as not to align both end faces of an aggregate in the formation of the aggregate.

c. Sectional shape of the filter aggregate is changed into a circle, an ellipsoid or a triangle shape.

In the invention, a porous metal filter or a filter using ceramic fibers can be used as a filter.

Furthermore, when the sectional shape of the filter is changed, only the plural filter units having a shape other than a quadratic prism at cut section can be changed by filters having a strength stronger than the other honeycomb filter having a quadratic prism. Thus, the lacking of the strength in the filter of irregular shape is solved, whereby the strength as the filter can be improved.

In the invention, the pore distribution can be made broad instead of sharp. In this case, low pressure loss in the catching is obtained.

Example 6

Figure 9:
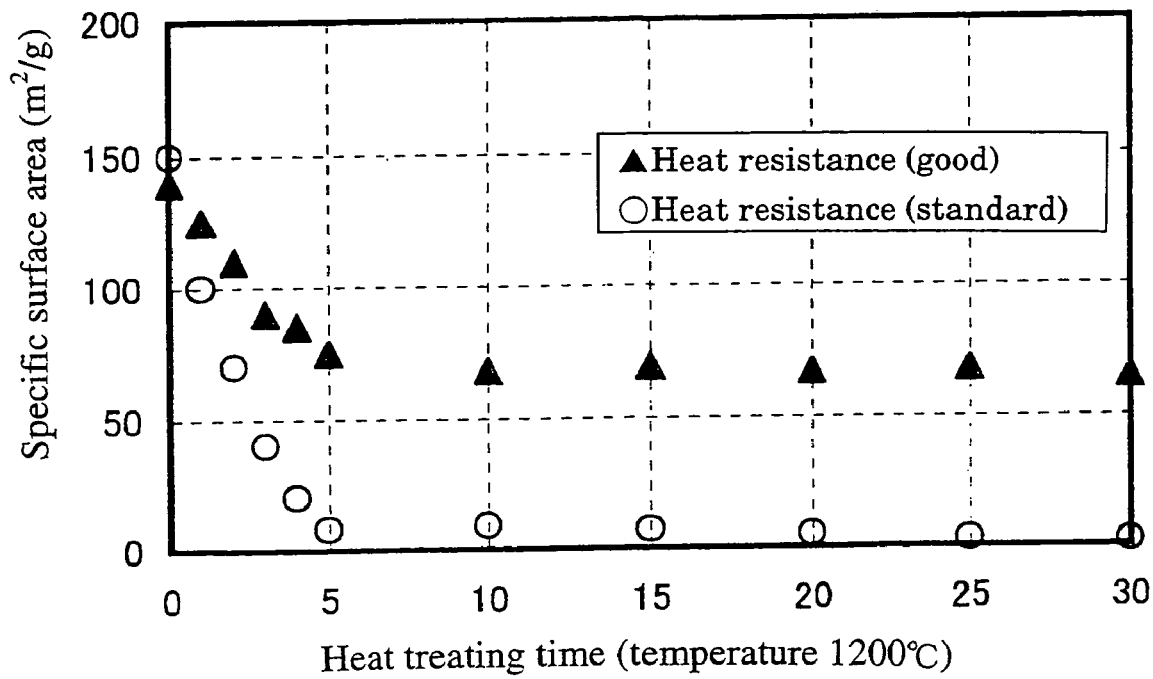
FIG. 9 is a graph showing a relation between specific surface area exerting upon a heat resistance of a catalyst and a heat treating time.

This example is carried out for confirming the action and effect of the ceramic filters using the above catalysts of different heat resistances. Each of the ceramic filters produced under conditions shown in Table 8 (Example 6-1, Comparative Example 6-1 and Comparative Example 6-2) is attached to an exhaust gas purifying apparatus of a diesel automobile as a ceramic filter to conduct a purification test. For example, the catalyst having a good heat resistance is used by including 10% of a rare earth oxide such as $CeC_2$. Moreover, the distinction between the good and poor heat resistances in the catalyst is judged by observing the change amount of specific surface area after the heat treatment at 1200° C. as shown in FIG. 9. In this test are examined the regeneration ratio of the ceramic filter, temperature difference between the central portion and the peripheral portion of the filter to be measured every each filter unit F1 in the ceramic filter and the durability (regeneration ratio in the regeneration of 10 times). The results are also shown in Table 8.

As shown in Table 8, each of the example and the comparative examples shows a high value of not less than 90% at initial stage. The regeneration ratio after the use of 10 times is apparently high in Comparative Example 6-1 having a heat resistance, but the next value is Example 6-1 instead of Comparative Example 6-3. Also, as to the regeneration temperature, Example 6-1 shows a low value of the temperature difference as a whole as compared with the comparative examples. That is, the filter provided with the catalyst having a high heat resistance is arranged in the portion having a high regeneration temperature, so that the regeneration ratio is high after the use of 10 times.

TABLE 8

| | Example 6-1 | | Comparative Example 6-1 | | Comparative Example 6-2 | | Comparative Example 6-3 | |
|---|---|---|---|---|---|---|---|---|
| Heat resistance | Central Portion | Peripheral portion | Central Portion | Peripheral portion | Central Portion | Peripheral portion | Central Portion | Peripheral portion |
| Heat resistance | good | standard | good | standard | standard | standard | standard | good |
| Regeneration ratio | 92% | | 95% | | 90% | | 93% | |
| Regeneration ratio after use of several times | 78% | | 80% | | 50% | | 60% | |
| Regeneration temperature | 650° C. | 600° C. | 650° C. | 600° C. | 650° C. | 600° C. | 650° C. | 600° C. |

Example 7

Figure 10:
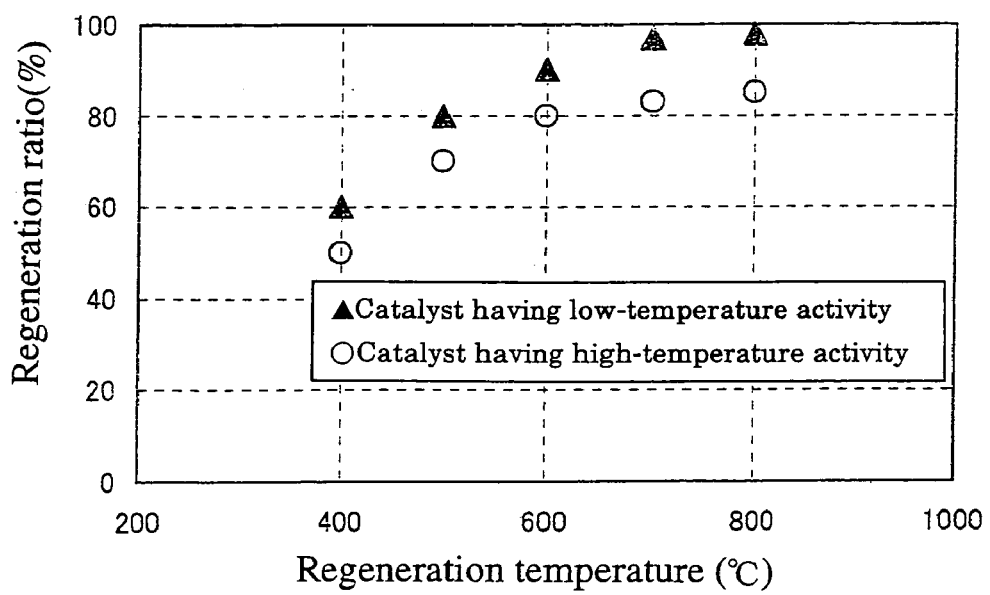
FIG. 10 is a graph showing a relation between a regeneration ratio and a temperature exerting upon an activating temperature of a catalyst.
Figure 11A:
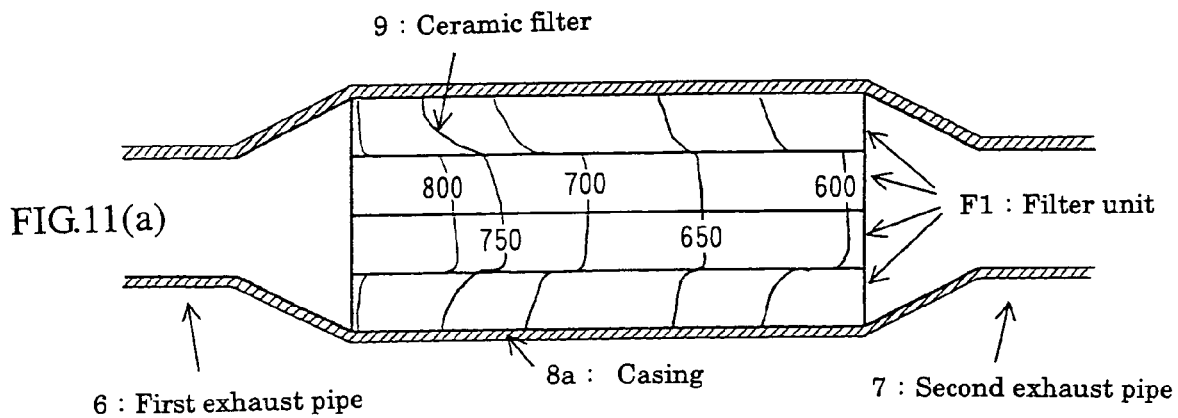
FIGS. 11(a) to 11(d) are section views illustrating a way of temperature propagation by changing arranging places of a casing and an exhaust pipe.
Figure 11B:
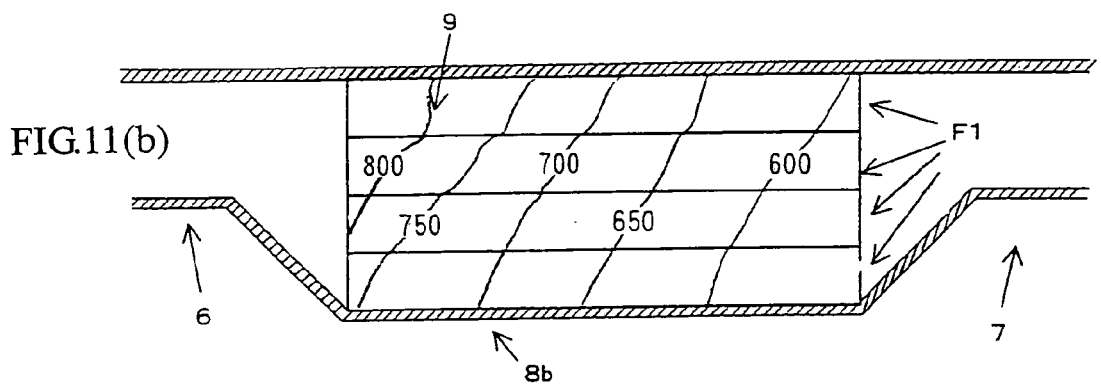
Figure 11C:
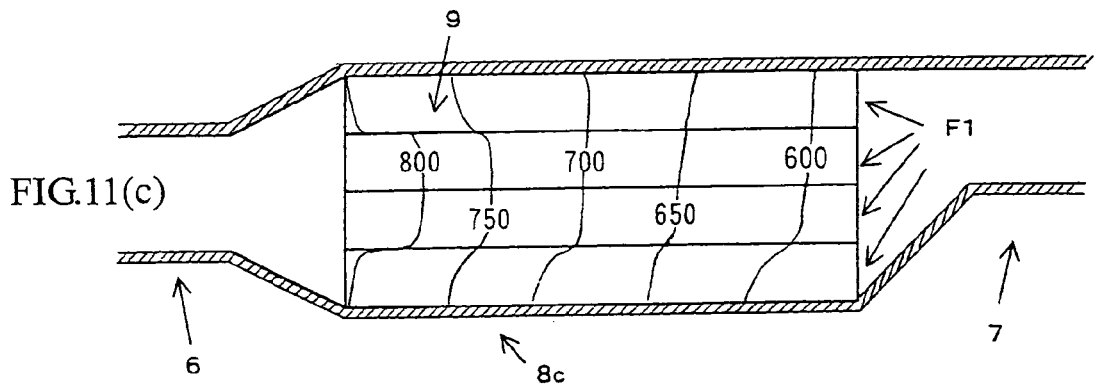
Figure 11D:
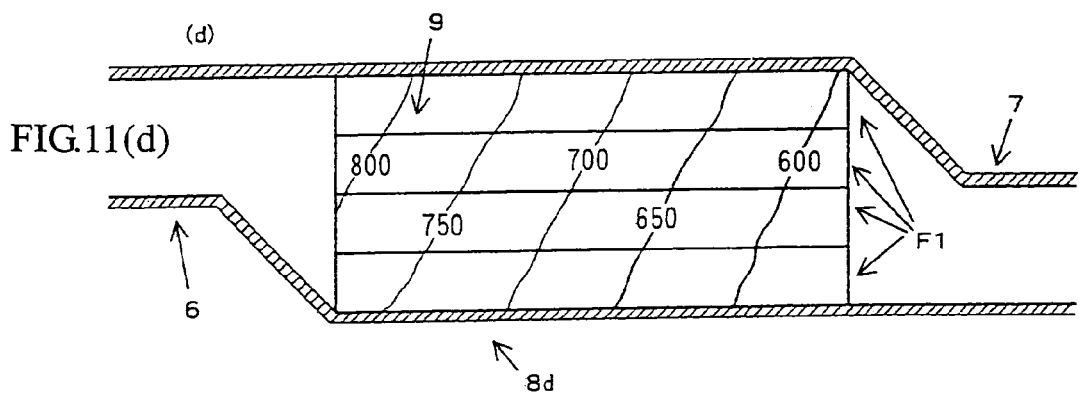
Figure 12A:
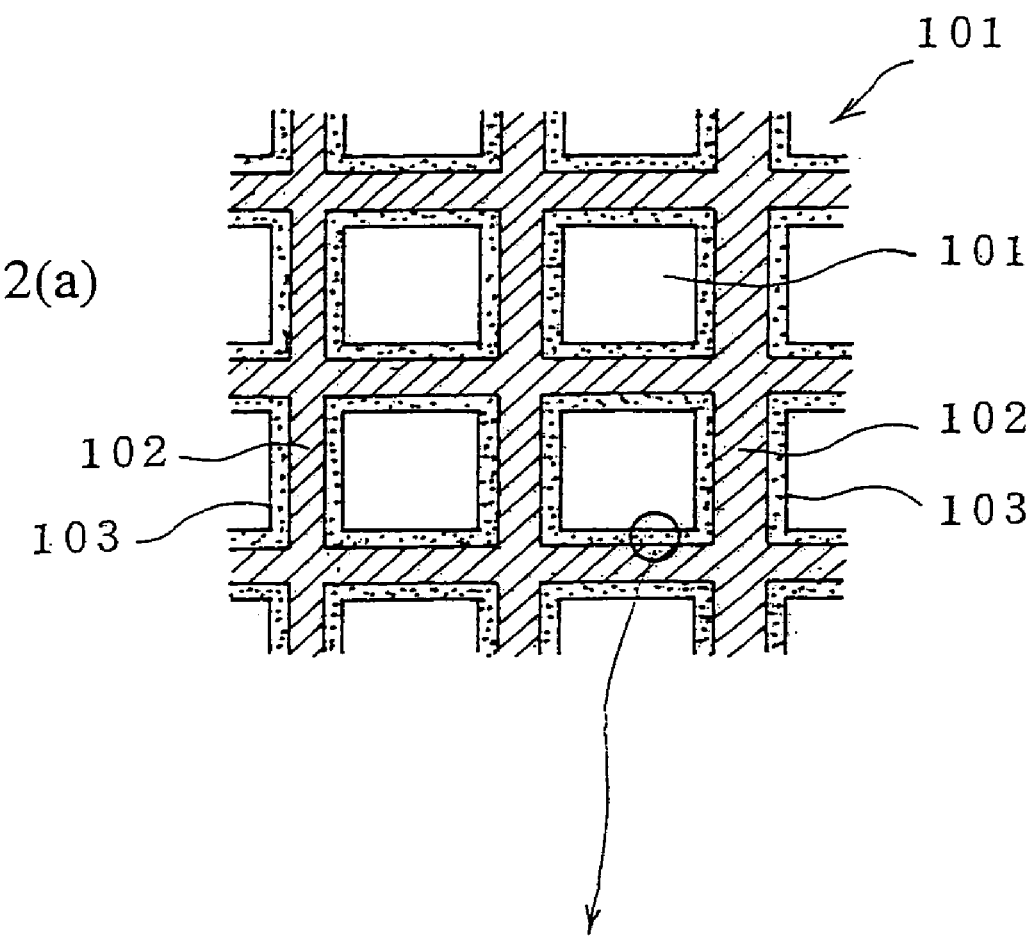
FIGS. 12(a) and 12(b) are schematically section views of an example of carrying a catalyst.
Figure 12B:
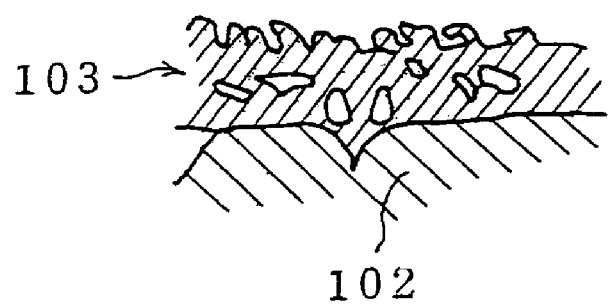
Figure 13:
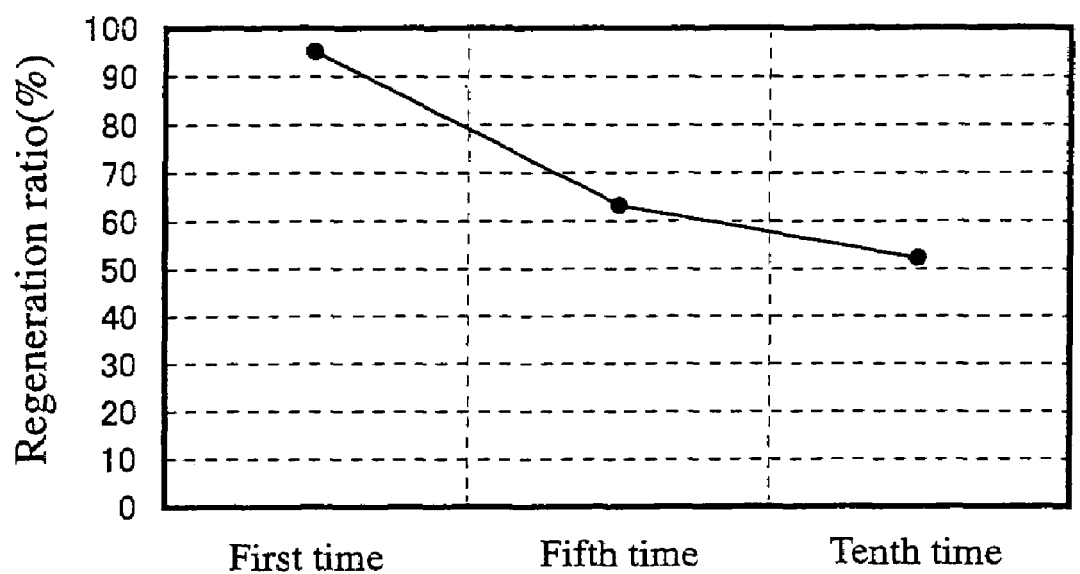
FIG. 13 is a graph showing a regeneration ratio after the use several times.

This example is carried out for confirming the action and effect of the ceramic filters prepared by using filters carried with catalysts having different active temperatures. That is, each of the ceramic filters produced under conditions shown in Table 9 (Example 7-1, Comparative Example 7-1, Comparative Example 7-2, Comparative Example 7-3) is attached to an exhaust gas purifying apparatus of a diesel automobile to conduct the purification test. Moreover, the distinction of the catalysts having different active temperatures is judged by observing a relationship between regeneration temperature and regeneration ratio as shown in FIG. 10. For example, a catalyst having a high-temperature activity means that when an initial filter after the provision of the catalyst (low-temperature active filter capable of well regenerating even at a low active temperature) is subjected to a heat treatment at 800° C. in an oxidizing atmosphere for 3 hours to lower the activity of the catalyst, whereby the regeneration can not be sufficiently conducted unless the active temperature is high. In this test are examined the regeneration ratio of the ceramic filter (aggregate) and the temperature difference between the central portion and the peripheral portion of the ceramic filter to be measured every each filter unit F1. The results are shown in Table 9.

As shown in Table 9, the temperature of each ceramic filter (aggregate) is 650° C. in the central portion and 600° C. in the peripheral portion. From this result, Example 7-1 and Comparative Example 7-1 show a high value of not less than 90% from an initial stage. However, the ceramic filter of Comparative Example 7-3 in which the same ceramic filters as in Example 7-1 are arranged in an opposite combination between the central portion and the peripheral portion shows the regeneration ratio lower than that of Example 7-1 because the activity in the peripheral portion is bad.

follows. At first, the ceramic filter is divided into two regions of 4 filter units of the central portion and 12 filter units of the peripheral portion. A ratio between the two regions is determined. Then, the carrying amount in the filter is determined by equally dividing so as to satisfy the above ratio every each filter. The regeneration ratio of the ceramic filter (aggregate), the temperature difference between the central portion and the peripheral portion of the filter to be measured every each filter unit and the durability (regeneration ratio after the regeneration of several times) are examined. The results are shown in Table 10.

As shown in Table 10, the temperature of each ceramic filter (aggregate) is 650° C. in the central portion and 600° C. in the peripheral portion. At the initial stage, the order of high regeneration ratio is Comparative Example 8-1, Example 8-1, Comparative Example 8-3, Example 8-2 and Comparative Example 8-2 in this order. This result is substantially the same order as the catalyst carrying amount in the ceramic filter as a whole.

When Example 8-1 is compared with Comparative Example 8-3, the same amount of the catalyst is carried on the ceramic filter (aggregate) itself, but the regeneration ratio is higher in Example 8-1. Also, when Example 8-2 is compared with Comparative Example 8-2, the same amount of the catalyst is carried on the ceramic filter (aggregate) itself, but the regeneration ratio is higher in Example 8-2. From these

TABLE 9

| | Example 7-1 | | Comparative Example 7-1 | | Comparative Example m7-2 | | Comparative Example 7-3 | |
|---|---|---|---|---|---|---|---|---|
| Active temperature | Central portion | Peripheral portion | Central portion | Peripheral portion | Central portion | Peripheral portion | Central portion | Peripheral portion |
| Active temperature | low | high | high | high | low | low | high | low |
| Regeneration ratio | 90% | | 95% | | 80% | | 83% | |
| Regeneration ratio after use of several times | 70% | | 75% | | 65% | | 70% | |
| Regeneration temperature | 650° C. | 600° C. | 650° C. | 600° C. | 650° C. | 600° C. | 650° C. | 600° C. |

Example 8

This example is carried out for confirming the action and effect of the ceramic filters having different carrying amounts of the catalyst. That is, each of the ceramic filters produced under conditions shown in Table 10 (Example 8-1, Example 8-2, Comparative Example 8-1, Comparative Example 8-2, Comparative Example 8-3) is attached to an exhaust gas purifying apparatus to conduct the purification test. In this test, the carrying amount of the catalyst is determined as results, it is effective that the catalyst carrying amount is larger in the peripheral portion than in the central portion.

Next, the results after the regeneration is repeated several times are considered. As a result of comparison between Example 8-1 and Comparative Example 8-3 or between Example 8-2 and Comparative Example 8-2, the regeneration ratio after the repetition of several times tends to become high when the catalyst amount in the peripheral portion is higher (Example 8-1, Example 8-2).

TABLE 10

| Carrying amount | Example 8-1 | | Example 8-2 | | Comparative Example 8-1 | | Comparative Example 8-2 | | Comparative Example 8-3 | |
|---|---|---|---|---|---|---|---|---|---|---|
| | Central portion | Peripheral portion | Central portion | Peripheral portion | Central portion | Peripheral portion | Central portion | Peripheral portion | Central portion | Peripheral portion |
| Carrying amount per one filter (g/L) | 0.25 | 0.167 | 0 | 0.167 | 0.5 | 0.167 | 0.25 | 0.083 | 0.5 | 0.083 |
| Ratio of carrying amount between regions | 1 | 2 | 0 | 2 | 2 | 2 | 1 | 1 | 2 | 1 |
| Regeneration ratio | 90% | | 80% | | 95% | | 75% | | 80% | |
| Regeneration ratio after use of several times | 72% | | 70% | | 75% | | 60% | | 65% | |
| Regeneration temperature | 650° C. | 600° C. | 650° C. | 600° C. | 650° C. | 600° C. | 650° C. | 600° C. | 650° C. | 600° C. |

Example 9

This example is carried out for confirming the action and effect of the ceramic filters (aggregates) having different carrying regions of the catalyst carrying amount. Each of the ceramic filters produced under conditions shown in Table 11 (Example 9-1, Comparative Example 9-1, Comparative Example 9-2, Comparative Example 9-3) is attached to an exhaust gas purifying apparatus of a diesel automobile as a filter aggregate to conduct the purification test.

In this test, the catalyst carrying amount is determined as follows. At first, the ceramic filter (aggregate) is divided into two regions of 4 filter units of the central portion and 12 filter units of the peripheral portion. A ratio between the two regions is determined. Then, the carrying amount in the filter is determined by equally dividing so as to satisfy the above ratio every each filter. The regeneration ratio of the ceramic filter (aggregate), the temperature difference between the central portion and the peripheral portion of the all filters to be measured every each filter unit in the aggregate and the durability (regeneration ratio after the regeneration of 10 times) are examined. The results are shown in Table 11.

As shown in Table 11, the temperature of each ceramic filter (aggregate) is 650° C. in the central portion and 600° C. in the peripheral portion. At the initial stage, the order of high regeneration ratio is Example 9-1, Comparative Example 9-1, Comparative Example 9-3 and Comparative Example 9-2 in this order. This result is substantially the same order as the catalyst carrying amount in the ceramic filter as a whole.

The, as the regeneration ratio after the use of 10 times is measured, the regeneration ratio in Example 9-1 is larger than in Comparative Example 9-3. Therefore, it is possible to reduce the catalyst amount in the central portion being high temperature.

TABLE 11

| Carrying region | Example 9-1 | | Comparative Example 9-1 | | Comparative Example 9-2 | | Comparative Example 9-3 | |
|---|---|---|---|---|---|---|---|---|
| | Central portion | Peripheral portion | Central portion | Peripheral portion | Central portion | Peripheral portion | Central portion | Peripheral portion |
| Carrying region from end face | | 1 | 0 | 1 | | | | 1 |
| Regeneration ratio | 95% | | 90% | | 80% | | 85% | |
| Regeneration ratio after use of several times | 65% | | 58% | | 60% | | 63% | |
| Regeneration temperature | 650° C. | 600° C. | 650° C. | 600° C. | 650° C. | 600° C. | 650° C. | 600° C. |

As seen from the above explanation, according to the invention, there can be obtained the following effects.

(1) In the filter aggregate formed by combining a plurality of honeycomb filter units carried with two or more catalysts having different heat resistances, the heat resistance of the catalyst in the high-temperature portion is improved to prevent the sintering, whereby the aggregate can be used over a long time without waste.

(2) In the ceramic filter aggregate formed by combining filter units carried with two or more catalysts having different catalyst active temperatures, it is possible to improve the regeneration ratio in the low-temperature portion.

(3) In the ceramic filter aggregate formed by combining filter units carried with two or more catalysts of different carrying amounts, it is possible to improve the regeneration ratio in the low-temperature portion.

(4) In the ceramic filter formed by combining two or more kinds of filter units having different carrying regions of the catalyst, it is possible to reduce the catalyst amount of the filter in the high-temperature portion.

Moreover, the above embodiments of the invention may be changed as follows. That is, heat is applied to the ceramic filter (aggregate) by the exhaust gas in these embodiments, but the same exhaust gas purifying apparatus can be applied to the portion of regenerating the filter by means of a heating means such as a heater or the like.

As shown in FIGS. 12(*a*) and 12(*b*), a great amount of the catalyst may be adhered to the wall or may be penetrated into the interior. In FIGS. 12(*a*) and 12(*b*), reference characters 101, 102 and 103 indicate cell, cell wall, and catalyst, respectively.

Next, the technical ideas grasped by the above embodiments are mentioned together with their effects in addition to the technical idea described in the claims below.

(1) The filter is not limited to only one kind. The ceramic filter capable of uniformly catching by changing the pore size, porosity or the like is prepared by the aggregate of filter units as described in the claims, whereby more uniform regeneration can be conducted.

(2) Although the catalyst is separately adhered every filter unit in the above embodiments, the same filter as mentioned above can be prepared by partly adhering a seal onto an end face of one filter and immersing into a slurry.

INDUSTRIAL APPLICABILITY

The ceramic filter according to the invention is excellent in the strength and is excellent in the action of uniformly catching soot and uniformly conducting the regeneration, so that it can be used in the exhaust gas purifying apparatus for an automobile. Particularly, the invention can be utilized in an exhaust gas purifying apparatus of a diesel engine.

The invention claimed is:

1. A ceramic filter comprising:
   a plurality of filter units each comprising a columnar porous ceramic sintered body having a honeycomb structure in which either ends of the filter units are plugged; and
   a sealing material layer bundling the filter units into an aggregate block,
   wherein the aggregate block comprises a fast gas flow rate portion and a slow gas flow rate portion,
   wherein the plurality of filter units includes ones having a small porosity positioned in the fast gas flow rate portion and other ones having a large porosity positioned in the slow gas flow rate portion.

2. A ceramic filter according to claim 1, wherein the plurality of filter units are made of a ceramic sintered body formed from same materials.

3. A ceramic filter according to claim 2, wherein each of the filter units comprises a quadratic porous silicon carbide sintered body.

4. A ceramic filter comprising:
   a plurality of filter units each comprising a columnar porous ceramic sintered body having a honeycomb structure in which either ends of the filter units are plugged; and
   a sealing material layer bundling the filter units into an aggregate block,
   wherein the aggregate block comprises a fast gas flow rate portion and a slow gas flow rate portion,
   wherein the plurality of filter units includes ones having a large pore size positioned in the fast gas flow rate portion and other ones having a small pore size positioned in the slow gas flow rate portion.

5. A ceramic filter according to claim 4, wherein the plurality of filter units are made of a ceramic sintered body formed from same materials.

6. A ceramic filter according to claim 5, wherein each of the filter units comprises a quadratic porous silicon carbide sintered body.

7. A ceramic filter comprising:
   a plurality of filter units each comprising a columnar porous ceramic sintered body having a honeycomb structure in which either ends of the filter units are plugged; and
   a sealing material layer bundling the filter units into an aggregate block,
   wherein the aggregate block comprises a fast gas flow rate portion and a slow gas flow rate portion,
   wherein the plurality of filter units includes ones having a small strength positioned in the fast gas flow rate portion and other ones having a large strength positioned in the slow gas flow rate portion.

8. A ceramic filter according to claim 7, wherein the plurality of filter units are made of a ceramic sintered body formed from same materials.

9. A ceramic filter according to claim 8, wherein each of the filter units comprises a quadratic porous silicon carbide sintered body.

10. A ceramic filter comprising:
    a plurality of filter units each comprising a columnar porous ceramic sintered body having a honeycomb structure in which either ends of the filter units are plugged; and
    a sealing material layer bundling the filter units into an aggregate block,
    wherein the aggregate block comprises a fast gas flow rate portion and a slow gas flow rate portion, and
    wherein the filter units having a longer length are arranged in the fast gas flow rate portion.

11. A ceramic filter according to claim 10, wherein the plurality of filter units are made of a ceramic sintered body formed from same materials.

12. A ceramic filter according to claim 11, wherein each of the filter units comprises a quadratic porous silicon carbide sintered body.

13. A ceramic filter comprising:
    a plurality of filter units having a plurality of catalysts of different heat resistances, each of the filter units comprising a columnar porous ceramic sintered body having a honeycomb structure; and
    a sealing material layer bundling the filter units into an aggregate block,
    wherein the aggregate block comprises a fast gas flow rate portion and a slow gas flow rate portion,
    wherein the plurality of catalysts comprises a catalyst having a first heat resistance and a catalyst having a second heat resistance which is lower than said first heat resistance, and
    wherein the catalyst having a first heat resistance is carried in the fast gas flow rate portion, and the catalyst having a second heat resistance is carried in the slow gas flow rate portion.

14. A ceramic filter according to claim 13, wherein the plurality of filter units are made of a ceramic sintered, body formed from comprises the same materials.

15. A ceramic filter according to claim 14, wherein each of the filter units comprises a quadratic porous silicon carbide sintered body.

16. An exhaust gas purifying apparatus comprising:
    a ceramic filter configured to be installed in an exhaust pipe of a diesel automobile;

the ceramic filter comprising a plurality of filter units,
each comprising a columnar porous ceramic sintered body having a honeycomb structure in which either one ends of the filter units are plugged; and
a sealing material layer bundling the filter units into an aggregate block,
wherein the aggregate block comprises a fast gas flow rate portion and a slow gas flow rate portion,
wherein the plurality of filter units includes ones having a small porosity positioned in the fast gas flow rate portion and other ones having a large porosity positioned in the slow gas flow rate portion.

17. An exhaust gas purifying apparatus comprising:
a ceramic filter configured to be installed in an exhaust pipe of a diesel automobile, the ceramic filter comprising a plurality of filter units,
each comprising a columnar porous ceramic sintered body having a honeycomb structure in which either one ends of the filter units are plugged; and
a sealing material layer bundling the filter units into an aggregate block,
wherein the aggregate block comprises a fast gas flow rate portion and a slow gas flow rate portion,
wherein the plurality of filter units includes ones having a large pore size positioned in the fast gas flow rate portion and other ones having a small pore size positioned in the slow gas flow rate portion.

18. A exhaust gas purifying apparatus comprising:
a ceramic filter configured to be installed in an exhaust pipe of a diesel automobile, the ceramic filter comprising a plurality of filter units,
each comprising a columnar porous ceramic sintered body having a honeycomb structure in which either ends of the filter units are plugged; and
a sealing material layer bundling the filter units into an aggregate block,
wherein the aggregate block comprises a fast gas flow rate portion and a slow gas flow rate portion,
wherein the plurality of filter units includes ones having a small strength positioned in the fast gas flow rate portion and other ones having a large strength positioned in the slow gas flow rate portion.

19. An exhaust gas purifying apparatus comprising:
a ceramic filter configured to be installed in an exhaust pipe of a diesel automobile, the ceramic filter comprising a plurality of filter units,
each comprising a columnar porous ceramic sintered body having a honeycomb structure in which either ends of the filter units are plugged; and
a sealing material layer bundling the filter units into an aggregate block,
wherein the aggregate block comprises a fast gas flow rate portion and a slow gas flow rate portion, and
wherein the filter units having a longer length are arranged in the fast gas flow rate portion.

20. An exhaust gas purifying apparatus comprising:
a ceramic filter configured to be installed in an exhaust pipe of a diesel automobile, the ceramic filter comprising a plurality of filter units having a plurality of catalysts of different heat resistances, each of said filter units comprising a columnar porous ceramic sintered body having honeycomb structure; and
a sealing material layer bundling the filter units into an aggregate block,
wherein the aggregate block comprises a fast gas flow rate Portion and a slow gas flow rate portion,
wherein the plurality of catalysts comprises a catalyst having a first heat resistance and a catalyst having a second heat resistance which is lower than said first heat resistance, and
wherein the catalyst having a first heat resistance is carried in the fast gas flow rate portion, and the catalyst having a second heat resistance is carried in the slow gas flow rate portion.

21. An exhaust gas purifying apparatus according to claim 20, wherein the plurality of filter units includes ones having no catalyst and ones carrying at least one catalyst of the plurality of catalysts.

22. An exhaust gas purifying apparatus according to claim 20, wherein the plurality of filter units are made of a ceramic sintered body formed from same materials.

23. An exhaust gas purifying apparatus according to claim 22, wherein each of the filter units comprises a quadratic porous silicon carbide sintered body.

24. An exhaust gas purifying apparatus according to claim 21, wherein the plurality filter units are made of a ceramic sintered body formed from the same materials.

25. An exhaust gas purifying apparatus according to claim 24, wherein each of the filter units comprises a quadratic porous silicon carbide sintered body.

26. A ceramic filter according to claim 1, wherein the sealing material layer comprises ceramic adhesive, and outer peripheral faces of the ceramic filters are adhered with each other through the ceramic adhesive.

27. A ceramic filter according to claim 1, wherein the sealing material layer comprises ceramic sealing materials, and outer peripheral faces of the ceramic filters are adhered with each other through the ceramic sealing materials.

28. A ceramic filter according to claim 26, wherein the sealing material layer has a thickness of about 0.3 to 3 mm.

29. A ceramic filter according to claim 27, wherein the sealing material layer has a thickness of about 0.3 to 3 mm.

30. A ceramic filter according to claim 26, wherein the sealing material layer has a thickness of about 0.5 to 2 mm.

31. A ceramic filter according to claim 27, wherein the sealing material layer has a thickness of about 0.5 to 2 mm.

32. A ceramic filter according to claim 4, wherein the sealing material layer comprises ceramic adhesive, and outer peripheral faces of the ceramic filters are adhered with each other through the ceramic adhesive.

33. A ceramic filter according to claim 4, wherein the sealing material layer comprises ceramic sealing materials, and outer peripheral faces of the ceramic filters are adhered with each other through the ceramic sealing materials.

34. A ceramic filter according to claim 32, wherein the sealing material layer has a thickness of about 0.3 to 3 mm.

35. A ceramic filter according to claim 33, wherein the sealing material layer has a thickness of about 0.3 to 3 mm.

36. A ceramic filter according to claim 32, wherein the sealing material layer has a thickness of about 0.5 to 2 mm.

37. A ceramic filter according to claim 33, wherein the sealing material layer has a thickness of about 0.5 to 2 mm.

38. A ceramic filter according to claim 7, wherein the sealing material layer comprises ceramic adhesive, and outer peripheral faces of the ceramic filters are adhered with each other through the ceramic adhesive.

39. A ceramic filter according to claim 7, wherein the sealing material layer comprises ceramic sealing materials, and outer peripheral faces of the ceramic filters are adhered with each other through the ceramic sealing materials.

40. A ceramic filter according to claim 38, wherein the sealing material layer has a thickness of about 0.3 to 3 mm.

41. A ceramic filter according to claim 39, wherein the sealing material layer has a thickness of about 0.3 to 3 mm.

42. A ceramic filter according to claim 38, wherein the sealing material layer has a thickness of about 0.5 to 2 mm.

43. A ceramic filter according to claim 39, wherein the sealing material layer has a thickness of about 0.5 to 2 mm.

44. A ceramic filter according to claim 10, wherein the sealing material layer comprises ceramic adhesive, and outer peripheral faces of the ceramic filters are adhered with each other through the ceramic adhesive.

45. A ceramic filter according to claim 10, wherein the sealing material layer comprises ceramic sealing materials, and outer peripheral faces of the ceramic filters are adhered with each other through the ceramic sealing materials.

46. A ceramic filter according to claim 44, wherein the sealing material layer has a thickness of about 0.3 to 3 mm.

47. A ceramic filter according to claim 45, wherein the sealing material layer has a thickness of about 0.3 to 3 mm.

48. A ceramic filter according to claim 44, wherein the sealing material layer has a thickness of about 0.5 to 2 mm.

49. A ceramic filter according to claim 45, wherein the sealing material layer has a thickness of about 0.5 to 2 mm.

50. An exhaust gas purifying apparatus according to claim 16, wherein the sealing material layer comprises ceramic adhesive, and outer peripheral faces of the ceramic filters are adhered with each other through the ceramic adhesive.

51. An exhaust gas purifying apparatus according to claim 16, wherein the sealing material layer comprises ceramic sealing materials, and outer peripheral faces of the ceramic filters are adhered with each other through the ceramic sealing materials.

52. An exhaust gas purifying apparatus according to claim 50, wherein the sealing material layer has a thickness of about 0.3 to 3 mm.

53. An exhaust gas purifying apparatus according to claim 51, wherein the sealing material layer has a thickness of about 0.3 to 3 mm.

54. An exhaust gas purifying apparatus according to claim 50, wherein the sealing material layer has a thickness of about 0.5 to 2 mm.

55. An exhaust gas purifying apparatus according to claim 51, wherein the sealing material layer has a thickness of about 0.5 to 2 mm.

56. An exhaust gas purifying apparatus according to claim 17, wherein the sealing material layer comprises ceramic adhesive, and outer peripheral faces of the ceramic filters are adhered with each other through the ceramic adhesive.

57. An exhaust gas purifying apparatus according to claim 17, wherein the sealing material layer comprises ceramic sealing materials, and outer peripheral faces of the ceramic filters are adhered with each other through the ceramic sealing materials.

58. An exhaust gas purifying apparatus according to claim 56, wherein the sealing material layer has a thickness of about 0.3 to 3 mm.

59. An exhaust gas purifying apparatus according to claim 57, wherein the sealing material layer has a thickness of about 0.3 to 3 mm.

60. An exhaust gas purifying apparatus according to claim 56, wherein the sealing material layer has a thickness of about 0.5 to 2 mm.

61. An exhaust gas purifying apparatus according to claim 57, wherein the sealing material layer has a thickness of about 0.5 to 2 mm.

62. An exhaust gas purifying apparatus according to claim 18, wherein the sealing material layer comprises ceramic adhesive, and outer peripheral faces of the ceramic filters are adhered with each other through the ceramic adhesive.

63. An exhaust gas purifying apparatus according to claim 18, wherein the sealing material layer comprises ceramic sealing materials, and outer peripheral faces of the ceramic filters are adhered with each other through the ceramic sealing materials.

64. An exhaust gas purifying apparatus according to claim 62, wherein the sealing material layer has a thickness of about 0.3 to 3 mm.

65. An exhaust gas purifying apparatus according to claim 63, wherein the sealing material layer has a thickness of about 0.3 to 3 mm.

66. An exhaust gas purifying apparatus according to claim 62, wherein the sealing material layer has a thickness of about 0.5 to 2 mm.

67. An exhaust gas purifying apparatus according to claim 63, wherein the sealing material layer has a thickness of about 0.5 to 2 mm.

68. An exhaust gas purifying apparatus according to claim 19, wherein the sealing material layer comprises ceramic adhesive, and outer peripheral faces of the ceramic filters are adhered with each other through the ceramic adhesive.

69. An exhaust gas purifying apparatus according to claim 19, wherein the sealing material layer comprises ceramic sealing materials, and outer peripheral faces of the ceramic filters are adhered with each other through the ceramic sealing materials.

70. An exhaust gas purifying apparatus according to claim 68, wherein the sealing material layer has a thickness of about 0.3 to 3 mm.

71. An exhaust gas purifying apparatus according to claim 69, wherein the sealing material layer has a thickness of about 0.3 to 3 mm.

72. An exhaust gas purifying apparatus according to claim 68, wherein the sealing material layer has a thickness of about 0.5 to 2 mm.

73. An exhaust gas purifying apparatus according to claim 69, wherein the sealing material layer has a thickness of about 0.5 to 2 mm.

74. A ceramic filter according to claim 13, wherein the plurality of filter units includes ones having no catalyst and ones having at least one catalyst of the plurality of catalysts.

75. A ceramic filter comprising:
a plurality of filter units having a plurality of catalysts, each of the filter units comprising a columnar porous ceramic sintered body having a honeycomb structure;
a sealing material layer bundling the filter units into an aggregate block; and
said plurality of filter units including ones having no catalyst and ones carrying at least one kind of catalysts.

* * * * *